United States Patent
Allan et al.

(10) Patent No.: US 12,293,472 B2
(45) Date of Patent: May 6, 2025

(54) SYSTEMS AND METHODS FOR MASKING A RECOGNIZED OBJECT DURING AN APPLICATION OF A SYNTHETIC ELEMENT TO AN ORIGINAL IMAGE

(71) Applicant: Intuitive Surgical Operations, Inc., Sunnyvale, CA (US)

(72) Inventors: Maximilian H. Allan, San Francisco, CA (US); Mahdi Azizian, San Jose, CA (US); A. Jonathan McLeod, Sunnyvale, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 198 days.

(21) Appl. No.: 17/793,595

(22) PCT Filed: Jan. 18, 2021

(86) PCT No.: PCT/US2021/013826
§ 371 (c)(1),
(2) Date: Jul. 18, 2022

(87) PCT Pub. No.: WO2021/150459
PCT Pub. Date: Jul. 29, 2021

(65) Prior Publication Data
US 2023/0050857 A1    Feb. 16, 2023

Related U.S. Application Data

(60) Provisional application No. 62/963,249, filed on Jan. 20, 2020.

(51) Int. Cl.
G06T 19/00    (2011.01)
G06T 7/20    (2017.01)
G06T 7/50    (2017.01)

(52) U.S. Cl.
CPC .............. *G06T 19/006* (2013.01); *G06T 7/20* (2013.01); *G06T 7/50* (2017.01); *G06T 2207/10016* (2013.01); *G06T 2210/41* (2013.01)

(58) Field of Classification Search
None
See application file for complete search history.

(56) References Cited

U.S. PATENT DOCUMENTS

2012/0206452 A1    8/2012 Geisner et al.
2018/0150929 A1*   5/2018 Pheiffer .................... G06T 3/14
(Continued)

OTHER PUBLICATIONS

International Search Report and Written Opinion for Application No. PCT/US2021/013826, mailed Apr. 22, 2021, 10 pages.

(Continued)

*Primary Examiner* — Yi Wang

(57) ABSTRACT

An exemplary object masking system is configured to mask a recognized object during an application of a synthetic element to an original image. For example, the object masking system accesses a model of a recognized object depicted in an original image of a scene. The object masking system associates the model with the recognized object. The object masking system then generates presentation data for use by a presentation system to present an augmented version of the original image in which a synthetic element added to the original image is, based on the model as associated with the recognized object, prevented from occluding at least a portion of the recognized object. In this way, the synthetic element is made to appear as if located behind the recognized object. Corresponding systems and methods are also disclosed.

17 Claims, 12 Drawing Sheets

(56) References Cited

U.S. PATENT DOCUMENTS

| | | | |
|---|---|---|---|
| 2018/0168740 A1* | 6/2018 | Ryan | A61B 90/36 |
| 2019/0197777 A1* | 6/2019 | Steinbrücker | G06T 15/20 |
| 2020/0005538 A1* | 1/2020 | Neeter | H04L 65/4015 |
| 2020/0090405 A1* | 3/2020 | Lagmanson | G06T 19/006 |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Preliminary Report on Patentability for Application No. PCT/US2021/013826, mailed on Aug. 4, 2022, 08 pages.

* cited by examiner

SYSTEMS AND METHODS FOR MASKING A RECOGNIZED OBJECT DURING AN APPLICATION OF A SYNTHETIC ELEMENT TO AN ORIGINAL IMAGE

RELATED APPLICATIONS

The present application is a U.S. National Stage Application under 35 U.S.C. § 371 of International Application No. PCT/US2021/013826, filed on Jan. 18, 2021, which claims priority to U.S. Provisional Patent Application No. 62/963,249, filed Jan. 20, 2020, the contents of which are hereby incorporated by reference in their entirety.

BACKGROUND INFORMATION

In various scenarios and for various use cases, image capture devices of various imaging modalities are used to capture imagery including objects and scenery viewable at different sites and locations. As one example, a camera may be used to capture a photograph of a person attending an event, a car driving along a road, an interior of a house that is for sale, or the like. As another example, an endoscope or other medical imaging modality may be used to capture endoscopic imagery at a surgical site (e.g., a surgical space within a body of a patient).

Imagery captured by these devices may ultimately be presented to viewers. Referring to the examples above, for instance, the photograph of the person may be shared with friends and family of the person, the photograph of the car may be used for a print advertisement in a magazine, the photograph of the house interior may be included in a real estate posting for the house, and so forth. In the surgical imaging example, the endoscopic imagery may be presented, by way of different types of display devices, to a surgical team to thereby facilitate the surgical team in visualizing the surgical space while performing a surgical procedure.

In any of these or various other examples, it may be desirable for captured images to be augmented by adding synthetic elements (e.g., augmented reality overlays, etc.) to the images. For example, synthetic elements such as depictions of objects, imagery, information, and/or other augmentations not actually captured by the capture device with the rest of the imagery may be added (e.g., overlaid onto the other imagery). However, it may not always be desirable for such synthetic elements to be presented in front of all the other imagery depicted in a particular image.

SUMMARY

The following description presents a simplified summary of one or more aspects of the systems and methods described herein. This summary is not an extensive overview of all contemplated aspects and is intended to neither identify key or critical elements of all aspects nor delineate the scope of any or all aspects. Its sole purpose is to present one or more aspects of the systems and methods described herein as a prelude to the detailed description that is presented below.

An exemplary system includes a memory storing instructions and a processor communicatively coupled to the memory and configured to execute the instructions to mask a recognized object during an application of a synthetic element to an original image. More particularly, the exemplary system accesses a model of a recognized object depicted in an original image of a scene, associates the model with the recognized object, and generates presentation data for use by a presentation system to present an augmented version of the original image in which a synthetic element added to the original image is, based on the model as associated with the recognized object, prevented from occluding at least a portion of the recognized object.

An exemplary method for masking a recognized object during an application of a synthetic element to an original image is performed by an object masking system. The method includes accessing a model of a recognized object depicted in an original image of a scene, associating the model with the recognized object, and generating presentation data for use by a presentation system to present an augmented version of the original image in which a synthetic element added to the original image is, based on the model as associated with the recognized object, prevented from occluding at least a portion of the recognized object.

An exemplary non-transitory computer-readable medium stores instructions that, when executed, direct a processor of a computing device to mask a recognized object during an application of a synthetic element to an original image. More particularly, the instructions direct the processor to access a model of a recognized object depicted in an original image of a scene, associate the model with the recognized object, and generate presentation data for use by a presentation system to present an augmented version of the original image in which a synthetic element added to the original image is, based on the model as associated with the recognized object, prevented from occluding at least a portion of the recognized object.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
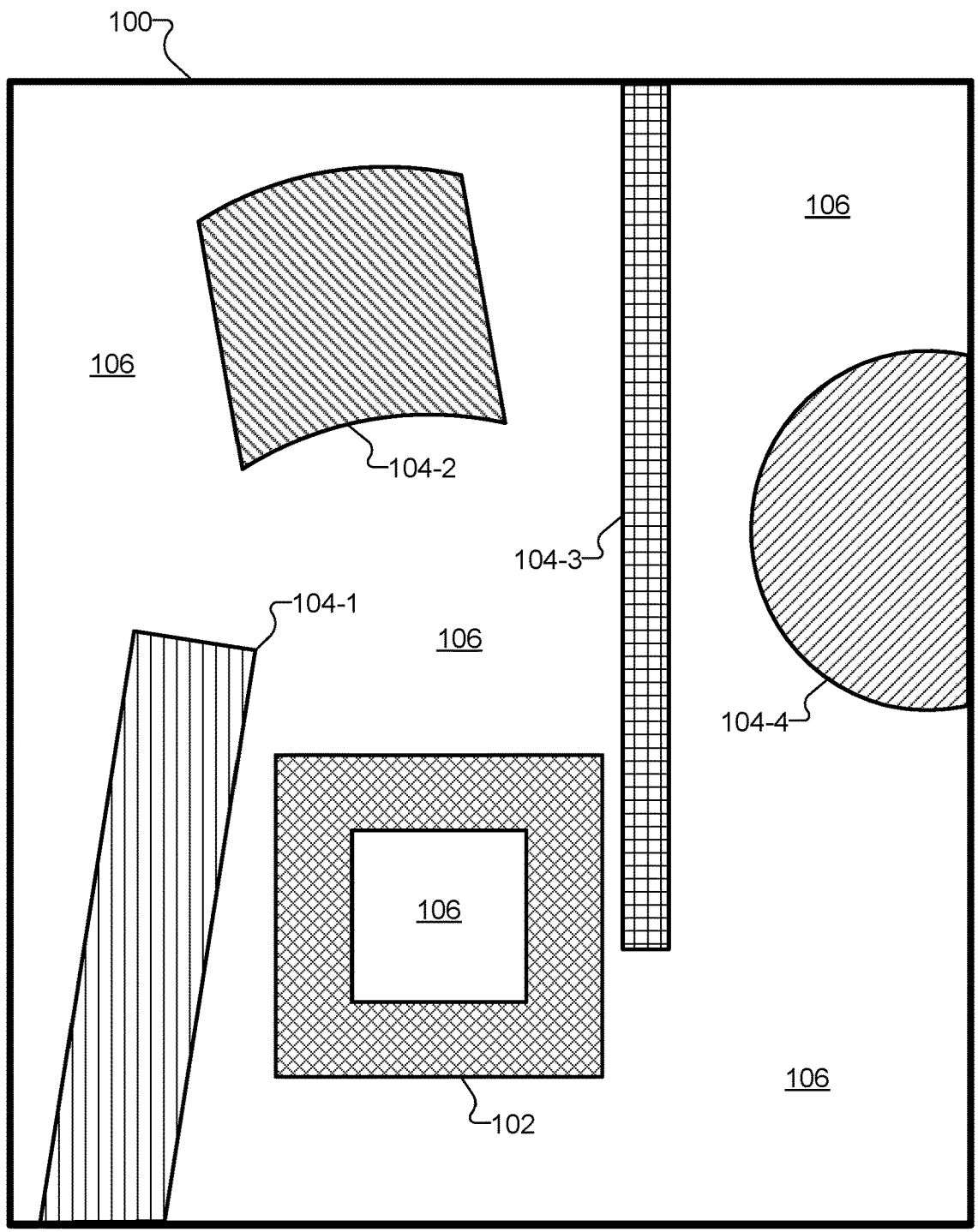
FIG. 1 illustrates an exemplary image depicting imagery that includes a variety of objects according to principles described herein.

Systems and methods for masking a recognized object during an application of a synthetic element to an original image are described herein. When augmenting an original image with one or more synthetic elements (e.g., an augmented reality overlay, etc.), conventional systems add the synthetic elements to (e.g., overlay the synthetic elements onto) other content of an original image in a manner that puts the synthetic elements in front of or on top of all the other content of the image (i.e., in a graphical layer that is visible while covering other layers of the other content that are behind or in back of the layer of overlaid content). System and methods described herein, however, help address scenarios in which certain content of the image (e.g., one or more particular objects depicted in the image) is to be depicted as if in front of (or on top of) the augmented material.

As used herein, augmented reality technologies, scenarios, images, and so forth will be understood to include both original elements (e.g., imagery captured from a real-world scene) and augmentations (e.g., synthetic elements not actually present at the scene but made to appear as if they are) in a presentation of reality that mixes the original and augmented elements in any suitable way. As such, it will be understood that the term "augmented reality" may refer to any type of augmented, mixed, virtual, or other type of extended reality at any point on a spectrum of virtuality as may serve a particular implementation, and is not to be limited to any particular definition of "augmented reality" that may be used in the art.

Systems and methods described herein improve the augmented reality of a scenario in which an augmentation such as a three-dimensional ("3D") anatomical model is presented in an augmented endoscopic image being captured as a surgical procedure is being performed. In this situation, members of the surgical team benefit from an augmented reality experience in which the augmentation (e.g., the 3D anatomical model) is depicted behind the surgical instruments shown in the endoscopic view. For instance, such layering may make the augmentation seem more natural and less distracting or disorienting than the augmentation being overlaid in front of the surgical instruments in the augmented reality image, and/or may otherwise facilitate the surgical procedure or be preferred by surgical team members viewing the endoscopic augmented reality images.

To this end, systems and methods described herein for masking a recognized object during an application of a synthetic element to an original image may involve tracking a 3D position of a particular object (e.g., a recognized object such as a surgical instrument in the surgical procedure example above) by generating a dense, accurate depth map of the instrument's surface based on a 3D model (e.g., a computer-aided design ("CAD") model, a pre-scanned 3D representation, etc.) of the instrument that is available to the system. For instance, the depth map in this example may be generated by using kinematic data and/or computer vision techniques that allow the system to track the position and orientation of the surgical instrument in space, as well as by using camera calibration data (e.g., intrinsic parameters defined for the endoscope, etc.) to determine how the surgical instrument is depicted in imagery captured by the endoscope based on the instrument's position and orientation in space. The depth map generated or acquired in this way may be used to efficiently and accurately create a mask that allows the object to appear to be in front of the overlay when the overlay is applied to the image (e.g., overlaid onto or otherwise integrated with the image), rather than the overlay appearing to be in front of the object as in conventional designs.

An exemplary object masking system in accordance with embodiments described herein may comprise a memory storing instructions and a processor communicatively coupled to the memory and configured to execute the instructions to perform various operations to mask a recognized object during an application of a synthetic element to an original image. More particularly, the object masking system may access a model of a recognized object depicted in an original image of a scene, associate the model with the recognized object, and generate presentation data for use by a presentation system to present an augmented version of the original image in which a synthetic element added to the original image is, based on the model as associated with the recognized object, prevented from occluding at least a portion of the recognized object.

Such functions may be performed in any suitable manner. As one example, for instance, the exemplary object masking system may perform an operation such as identifying, within imagery depicted by an image, a recognized object for which a model is available to the system. For instance, in the surgical example mentioned above, the image may be an endoscopic image depicting a surgical site and the recognized object may be an instrument or other known object for which a model (e.g., a 3D CAD model, etc.) is available. As such, the object masking system may access the model of the recognized object in response to the identifying of the recognized object, and may associate the model with the recognized object. This association may include registering the model to the recognized object as depicted in the image in any manner. In some examples, the object masking system may segment the image (e.g., based on or as part of the associating of the model with the recognized object) to distinguish pixels of the image that depict the recognized object from pixels of the image that do not depict the recognized object. For instance, based on the model of the surgical instrument in the example above, as well as based on tracked or accessed data such as the position and orientation of the surgical instrument and/or the camera calibration parameters of the endoscope in certain examples, the object masking system may accurately and precisely identify which pixels in a particular endoscopic image are part of the surgical instrument and which pixels are part of other content besides the surgical instrument.

After associating the model with the recognized object (e.g., as well as, in certain examples, segmenting the image) in this manner, the object masking system may perform another operation in which presentation data is generated.

The presentation data may include image data in certain examples (e.g., image data representative of an augmented version of the original image, etc.) and, in the same or other examples, may include masking data representative of the segmented image. In either case, the presentation data may be generated so as to be used by a presentation system (an augmented reality presentation system, etc.) to which the presentation data is provided. The presentation system may present an augmented version of the original image (i.e., an augmented reality image) that is based on the original image (e.g., the endoscopic image depicting the surgical site in the example above). In the augmented reality image, a synthetic element (e.g., an augmented reality overlay such as a view of an underlying anatomical mod& or other such information configured to facilitate the surgical procedure in the above example) may be added to the original image in such a way that the synthetic element is prevented, based on the mod& as associated with the recognized object, from occluding at least a portion of the recognized object.

For example, the synthetic element may be applied only to the pixels of the image that do not depict the recognized object. More particularly, in the surgical instrument example, the depiction of the surgical instrument may be filtered so as to not be covered by the synthetic element such that the synthetic element appears, in the augmented version of the original image, to be located behind the recognized object. In this way, the surgical instrument may be clearly seen in the surgical augmented reality example, and the anatomical model (or other synthetic element or augmented reality overlay) may be depicted to be behind the instrument (e.g., appearing to be projected directly onto the tissue behind the instrument).

Systems and methods described herein for masking a recognized object during an application of a synthetic element to an original image may provide and be associated with various benefits and advantages. For example, by depicting synthetic elements (e.g., augmented reality overlays) in front of certain imagery or objects and behind other imagery or objects in an image, the systems and methods described herein may facilitate the generation of augmented reality images that look more natural and integrated, are more helpful and attractive, and are less distracting and/or disorienting than conventional augmented reality images in which synthetic elements are overlaid in front of all the imagery and other objects.

Conventional techniques for creating depth maps to assist with object segmentation have relied exclusively on conventional depth detection technologies such as stereoscopic depth detection technologies, monoscopic structure from motion ("SfM") technologies, simultaneous localization and mapping ("SLAM") technologies, and other such depth detection technologies. Such technologies, however, have inevitably presented various challenges and limitations that leave room for improvement when applied to the problem of masking certain objects, but not others, for the application of a synthetic element to an original image in the generation of an augmented reality image.

As an example of one such challenge, attempts to detect depth data for objects in real time (e.g., at render time as the augmented reality image is being presented to a user) have been of limited success due to real-time processing and latency limitations that make it difficult or impossible for a given system with finite processing resources to fully and accurately capture depth data for a scene in real time. As a result of these limitations, and as will be described in more detail below, depth data captured in conventional examples may result in relatively sparse depth maps, and edges of an object that is to appear in front of an augmented reality overlay may be relatively poorly defined or may exhibit unwanted artifacts that can be distracting and take away from the effect.

Advantageously, systems and methods described herein may generate, for certain objects, depth maps that are based on detailed models (e.g., 2D models, 3D models, etc.) that are already available to the system (i.e., that have already been generated rather than needing to be generated at runtime). In this way, systems and methods described herein may gain access to highly dense and accurate depth maps that, when associated with an image, allow for the image to be segmented accurately and precisely to distinguish the depiction of the recognized object from other depicted imagery. As such, the effect of a real object appearing to be in front of an augmented reality overlay may be greatly improved.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary image 100 that depicts imagery including a variety of objects. Specifically, for example, an object 102 is shown to be a hollow, square-shaped object, while objects 104 (i.e., objects 104-1 through 104-4) are shown to have other basic geometric shapes (e.g., rectangular shapes, circular shapes, etc.). As shown, each of shapes 102 and 104 are shaded with a different style of cross hatching representative of different colors, textures, and/or depths (relative locations) that each object may have. Additionally, each of objects 102 and 104 are depicted as being in front of a background 106, which is unshaded (i.e., white) in image 100.

While simple geometric objects are depicted in FIG. 1 and other figures in the drawings for clarity of illustration, it will be understood that the objects and other imagery depicted in an image such as image 100 may include any type of objects and/or imagery as may serve a particular implementation. For instance, objects 102 and/or 104 may represent any of the types of objects mentioned in the examples above (e.g., people, cars, homes, etc.) or any other types of objects as may be depicted in a particular image. While the principles described herein may apply to a broad number of different types of use cases, one particular use case that will be described in more detail below is a surgical use case in which the objects depicted in an image each relate to a surgical procedure. For example, as will be described, the objects and imagery in such an example may include anatomical objects and imagery inside a body on which the surgical procedure is being performed, surgical instruments and/or tools being used to perform the surgical procedure, and so forth.

Figure 2:
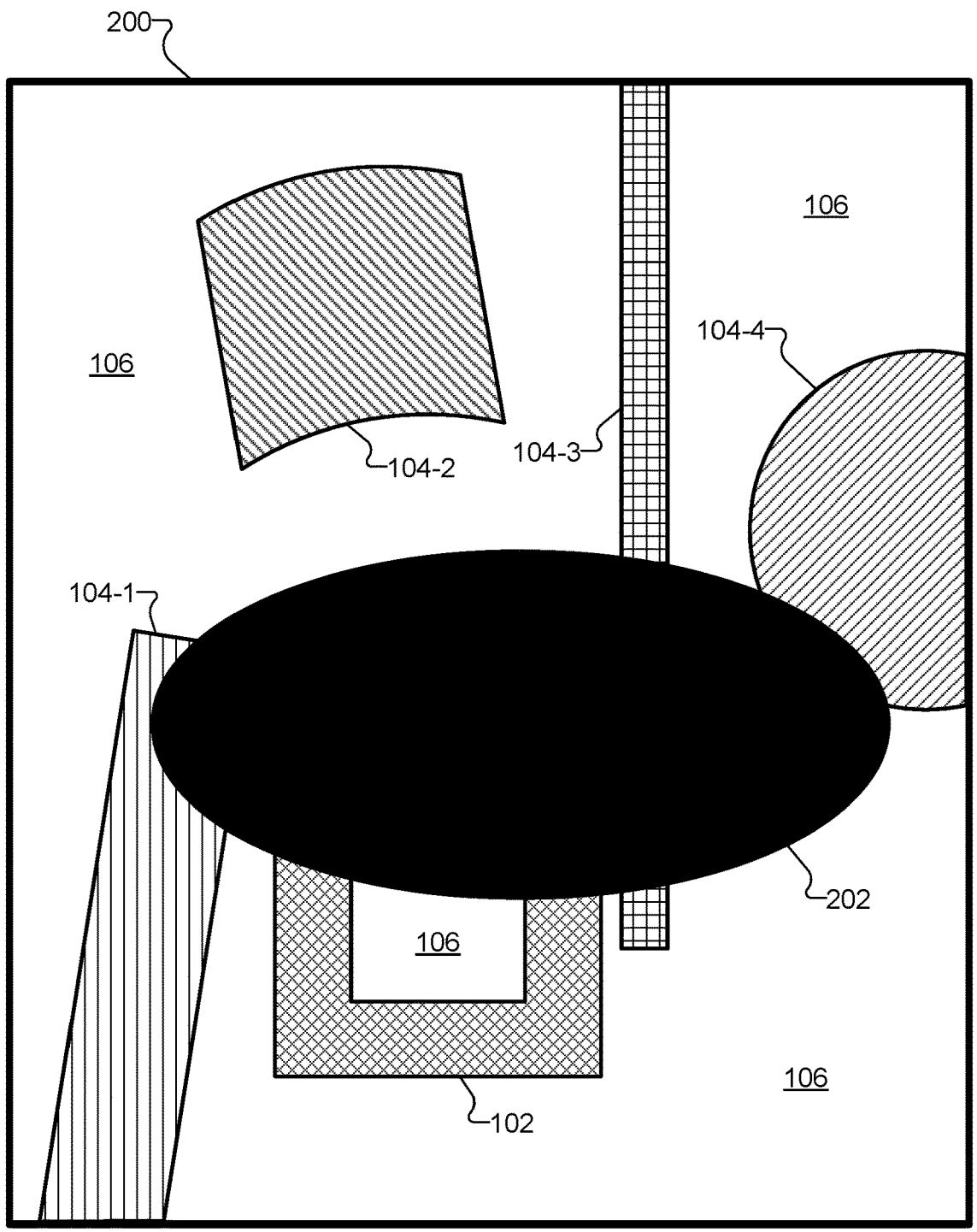
FIG. 2 illustrates an exemplary augmented version of the image of FIG. 1 and in which a synthetic element is applied to the image according to principles described herein.

FIG. 2 illustrates an exemplary augmented version of original image 100 that will hereafter be referred to as augmented reality image 200. Within augmented reality image 200, an synthetic element 202 (also referred to as augmented reality overlay 202) is applied to image 100. As shown, synthetic element 202 is an oval shaped object that is shaded with a solid black color. As mentioned above with respect to FIG. 1, while a basic geometric shape is used for illustrative purposes in FIG. 2, it will be understood that synthetic element 202 may represent any suitable type of augmentation as may serve a particular implementation. For instance, synthetic element 202 could represent an imaginary creature that is presented to be hiding in the real world for a user to find in an augmented reality game, a virtual piece of furniture that is presented at a certain location in a home to help a user imagine how the piece of furniture would look and fit in a room, a data graphic configured to inform a user about one of the real objects 102 or 104 depicted in image 100, or another suitable type of augmentation as may be appropriate in another augmented reality embodiment. As another example, synthetic element 202 could be implemented as a representation of an anatomical structure (e.g., a preoperatively scanned 3D model of subsurface anatomy, etc.) or another surgery-related object in the augmented-reality-enhanced surgical procedure example that has been mentioned.

As is typical for conventional implementations of augmented reality, synthetic element 202 is shown in FIG. 2 to be overlaid in front of all of objects 102 and 104 in the scene that are in the vicinity of synthetic element 202. That is, synthetic element 202 is shown to be "occluding," "on top of," or "in front of" each of the other objects and background since synthetic element 202 occludes these objects and imagery rather than being occluded by them (in which case synthetic element 202 could be said to be "occluded by," "behind," "beneath," or "in back of" the other objects, etc.).

While not shown in FIG. 2, it will be understood that, in certain scenarios and use cases, it may be desirable for synthetic element 202 to be depicted to be occluded by one or more of the objects depicted in image 100. For instance, for the purposes of the following description, it will be assumed that it is desirable for object 102 to be depicted in front of synthetic element 202 (i.e., for synthetic element 202 to be depicted behind object 102) even while synthetic element 202 is still depicted to be in front of objects 104 and background 106. To accomplish this effect of synthetic element 202 being occluded by (or at least partially occluded by) object 102, a depth map may be generated for image 100 that will allow object 102 to be differentiated from other objects and imagery of the image so that the pixels representative of object 102 may be masked so as to not be covered by synthetic element 202 when synthetic element 202 is applied to image 100 to form augmented reality image 200.

Figure 3:
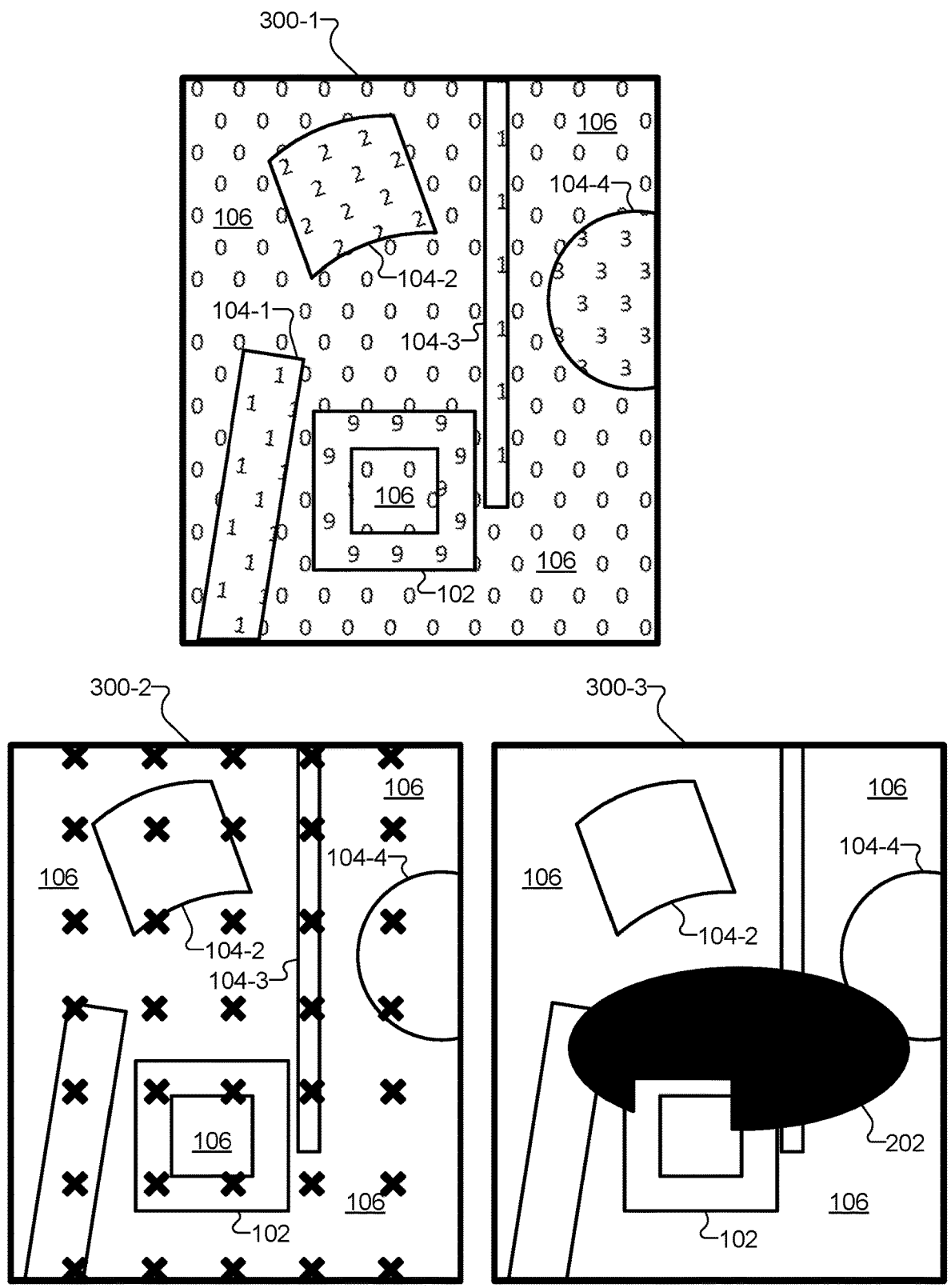
FIG. 3 illustrates exemplary aspects of how depth data may be detected and used to mask an object included in the imagery as a synthetic element is applied to the image according to principles described herein.

To illustrate, FIG. 3 shows exemplary aspects of how depth data may be detected and used to mask object 102 during an application of synthetic element 202 to original image 100 to form an augmented reality image according to principles described herein. Specifically, a representation 300-1 in FIG. 3 shows actual depth data for the objects and imagery of image 100, a representation 300-2 shows how a relatively sparse depth map of the objects and imagery of image 100 may be generated based on conventional depth detection techniques, and a representation 300-3 shows an implementation of augmented reality image 200 in which synthetic element 202 is depicted to be located behind object 102 (albeit in a non-ideal manner due to the relatively sparse depth map generated as a result of limitations of the conventional depth detection techniques). Each of representations 300 representations 300-1 through 300-3) will now be described in more detail.

Representation 300-1 depicts actual depth data for each of objects 102 and 104, as well as for background 106, in image 100. Specifically, for illustrative purposes, a simple notation using a 1-digit number (e.g., 0, 1, 2, etc.) is employed to differentiate areas of image 100 that depict imagery located at different depths with respect to an image capture device (e.g., a camera, an endoscope, etc.) that captured image 100. For example, in this notation, depth "0" (i.e., the depth of background 106) will be understood to be the farthest away of any depth shown from a vantage point of the image capture device, while depth "9" (i.e., the depth of object 102) will be understood to be the closest depth shown to the vantage point of the image capture device. Other depths shown in representation 300-1 such as depth "1" (i.e., the depth of objects 104-1 and 104-3), depth "2" (i.e., the depth of object 104-2), and depth "3" (i.e., the depth of object 104-4) will be understood to be closer to the vantage point than depth "0" of background 106, but farther from the vantage point than depth "9" of object 102.

If the imagery depicted in image 100 could be analyzed by one or more conventional depth detection techniques without any limitation in the time or resources used to perform the techniques, it might be possible for a system to generate a full and accurate depth map of the captured imagery. Unfortunately, however, significant limitations exist in many real-world scenarios that make it challenging or impossible for such an ideal depth map to be generated. For example, augmented reality typically must be generated and presented to a user in real time as the user looks around the world, which means that very strict time limitations may be associated with any processing or analysis of the world that is performed, including analysis to analyze the depth of objects in images captured by an image capture device. As a result, it may not be possible or practical to generate a dense depth map of the imagery using conventional depth detection techniques when practical time limits that are associated with a given augmented reality application are considered.

Representation 300-2 illustrates the consequence of such practical limitations. Specifically, rather than being able to detect the depth at every point (e.g., every pixel) depicted by image 100 as might be ideal given enough time and resources, practical limitations may constrain a real-world system to detect the depth of significantly fewer points of image 100. As shown, for example, a system may only have time and resources to use conventional depth detection technologies to detect the depth at each point of image 100 demarcated by a black "x" in representation 300-2, but may not have sufficient time and resources to determine the depth of the other points in image 100 (e.g., before needing to move on to process a subsequent frame in a video image). As a result, a depth map may be generated in real time, but the depth map may be relatively sparse and may fail to capture well the intricacies of object edges and other portions of the image where depth values change abruptly. For example, as shown in representation 300-2, the depth of object 102 may be captured at several points, but detail about the precise locations of the edges of object 102 and the fact that object 102 is hollow may not be discernible from the relatively sparse depth data that can be detected.

Representation 300-3 illustrates the result of using the relatively sparse depth map of representation 300-2 to differentiate object 102 and attempt to mask the object so as to appear to occlude synthetic element 202 (i.e., so as to appear to be in front of synthetic element 202). As shown in representation 300-3, a section of synthetic element 202 has been masked in a manner that roughly approximates the location of object 102 so as to not cover object 102 when synthetic element 202 is applied to image 100. However, due to the relatively sparse depth map, the edges of the masked portion do not align well with the edges of object 102 and the hollow portion is not properly accounted for. As a result, object 102 appears to interact to some degree with synthetic element 202, but the effect is likely unconvincing (e.g., and possibly distracting, disorienting, etc.) to a viewer desiring to see synthetic element 202 depicted behind object 102. While the sparseness of the depth data and the effects thereof may be somewhat exaggerated for purposes of illustration in FIG. 3, the principle should be understood that, if an augmented reality overlay such as synthetic element 202 is to be convincingly depicted to be occluded by an object like object 102, a denser depth map than may be practical to generate in real time using conventional depth detection techniques may be required.

Figure 4:
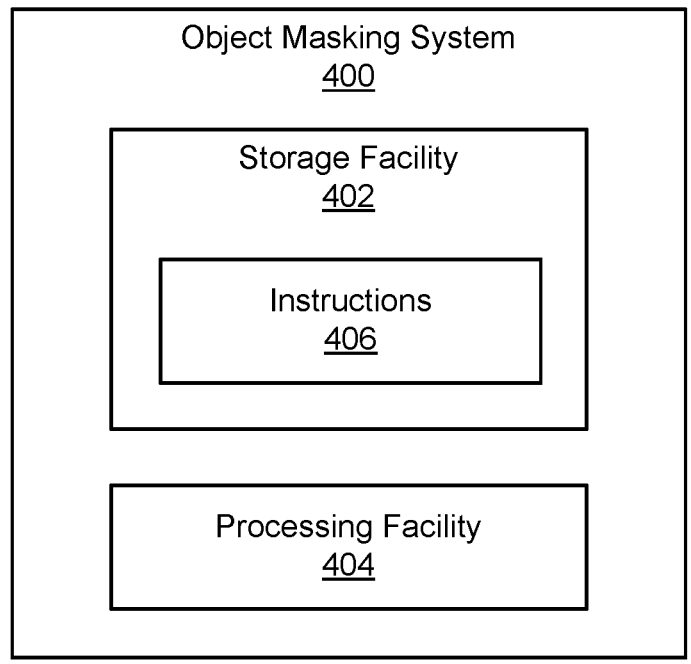
FIG. 4 illustrates an exemplary object masking system for masking a recognized object during an application of a synthetic element to an original image according to principles described herein.

To this end, FIG. 4 illustrates an exemplary object masking system 400 ("system 400") for masking a recognized object during an application of a synthetic element to an original image according to principles described herein. In certain examples, system 400 may be implemented by an augmented reality device or a general-purpose computing device used for various purposes (e.g., a mobile device such as a smartphone or tablet device, etc.). In certain augmented-reality-enhanced surgical procedure examples described herein, system 400 may be included in, implemented by, or connected to one or more components of a computer-assisted surgical system such as an exemplary computer-assisted surgical system that will be described below in relation to FIG. 9. For instance, in such examples, system 400 may be implemented by one or more components of a computer-assisted surgical system such as a manipulating system, a user control system, or an auxiliary system. In other examples, system 400 may be implemented by a stand-alone computing system (e.g., a stand-alone computing system communicatively coupled to a computer-assisted surgical system or implementing another non-surgical application or use case).

As shown in FIG. 4, system 400 may include, without limitation, a storage facility 402 and a processing facility 404 selectively and communicatively coupled to one another. Facilities 402 and 404 may each include or be implemented by one or more physical computing devices including hardware and/or software components such as processors, memories, storage drives, communication interfaces, instructions stored in memory for execution by the processors, and so forth. Although facilities 402 and 404 are shown to be separate facilities in FIG. 4, facilities 402 and 404 may be combined into fewer facilities, such as into a single facility, or divided into more facilities as may serve a particular implementation. In some examples, each of facilities 402 and 404 may be distributed between multiple devices and/or multiple locations as may serve a particular implementation.

Storage facility 402 may maintain (e.g., store) executable data used by processing facility 404 to perform any of the functionality described herein. For example, storage facility 402 may store instructions 406 that may be executed by processing facility 404 to perform one or more of the operations described herein. Instructions 406 may be implemented by any suitable application, software, code, and/or other executable data instance. Storage facility 402 may also maintain any data received, generated, managed, used, and/or transmitted by processing facility 404.

Processing facility 404 may be configured to perform (e.g., execute instructions 406 stored in storage facility 402 to perform) various operations associated with masking a recognized object during an application of a synthetic element to an original image (i.e., masking a recognized object during an application of an augmented reality overlay). Such operations may include, for instance, accessing a model of a recognized object depicted in an original image of a scene, associating the model with the recognized object, and generating presentation data for use by a presentation system to present an augmented version of the original image (e.g., an augmented reality image in which a synthetic element added to the original image is prevented, based on the model as associated with the recognized object, from occluding at least a portion of the recognized object).

Such operations may be performed in any suitable manner. For example, processing facility 404 may be configured to identify (e.g., within imagery depicted by an image such as image 100) a recognized object for which a model is available to system 400, and, in response to this identification, to access the model. The recognized object may be an object that is to be presented in front of an augmented reality overlay, such as object 102 in the example described above (assuming that a model is available for object 102).

Upon accessing the model, processing facility 404 may associate the model with the recognized object by accessing information indicative of how the recognized object is depicted within the image or in any other manner as may serve a particular implementation. In one example, as will be described in more detail below, if spatial data is available for the recognized object and/or for an image capture device capturing the image, such spatial data may be used by processing facility 404 to register a position and/or an orientation of the recognized object with respect to the capture device. Spatial data may include data supporting kinematic-based tracking, computer vision-based tracking, electromagnetic marker tracking, and/or other methodologies described herein or as may serve a particular implementation. Camera calibration parameters (e.g., intrinsic parameters) associated with the capture device may also be accessed for use by processing facility 404 in registering or otherwise associating the model with the recognized object as depicted in the image based on the position and/or orientation of the recognized object, as well as based on the 3D model.

Based on the associating of the model with the recognized object as depicted in the image (i.e., based on any or all of the accessed information such as the model of the recognized object, the camera calibration parameters, the spatial data used to determine the position and/or orientation, and so forth), processing facility 404 may segment the image to distinguish pixels of the image that depict the recognized object from pixels of the image that do not depict the recognized object. For instance, referring to the example of FIG. 1 above, processing facility 404 may use this information to differentiate pixels representing object 102 from pixels representing objects 104 and/or background 106.

Based on the associating of the model with the recognized object, processing facility 104 may generate presentation data for use by a presentation system (e.g., an augmented reality presentation system) to present an augmented version of the original image (e.g., analogous to augmented reality image 200). In some examples, the presentation data may include or be implemented as image data configured to be rendered and presented by the presentation system. In other examples, the presentation data may include data from which such renderable image can be constructed. For instance the presentation data may include masking data corresponding to image data for the original image (e.g., masking data representative of the segmentation of the image), as will be described and illustrated in more detail below. In still other examples, the presentation data may be another suitable type of presentation data that is configured for use by the presentation system to present the augmented version of the original image. In any case, the presentation data may allow the presentation system to present the augmented version such that a synthetic element added to the original image is prevented from occluding (i.e is at least partially occluded by) at least a portion of the recognized object. As will be described in more detail below, this presentation may be generated to have such characteristics based on the model as accessed and associated with the recognized object.

Based on the presentation data, the presentation system (e.g., a system implemented by system 400 or to which system 400 is communicatively coupled) may present an augmented reality image such as an implementation of augmented reality image 200 that is based on the original image and in which an augmented reality overlay such as synthetic element 202 is applied only to the pixels of the original image that do not depict the recognized object. In this manner, the augmented reality overlay may be depicted, in the augmented reality image, to be located behind the recognized object. For instance, referring to the example above, augmented reality overlay 202 may be applied only to pixels of image 100 that do not depict object 102 such that augmented reality overlay 202 is depicted to be located behind object 102 in a resultant augmented reality image.

As mentioned above, due to the nature of augmented reality and various augmented reality use cases, various implementations of system 400 may be configured to mask recognized objects during application of augmented reality overlays in real time, such as by performing the above or other operations as augmented reality images are presented to a user. As used herein, operations may be performed in "real time" when they are performed immediately and without undue delay. In some examples, real-time data processing operations may be performed in relation to data that is highly dynamic and time sensitive (e.g., data that becomes irrelevant after a very short time such as image data captured by an image capture device being moved and reoriented by a user to capture an image sequence representative of imagery at the site of the image capture device). As such, real-time operations will be understood to refer to those operations that mask a recognized object during an application of a synthetic element based on data that is relevant and up-to-date, even while it will also be understood that real-time operations are not performed instantaneously.

The operations described above, as well as other suitable operations that may be performed by processing facility 404, are described in more detail herein. In the description that follows, any references to functions performed by system 400 may be understood to be performed by processing facility 404 based on instructions 406 stored in storage facility 402.

Figure 5:
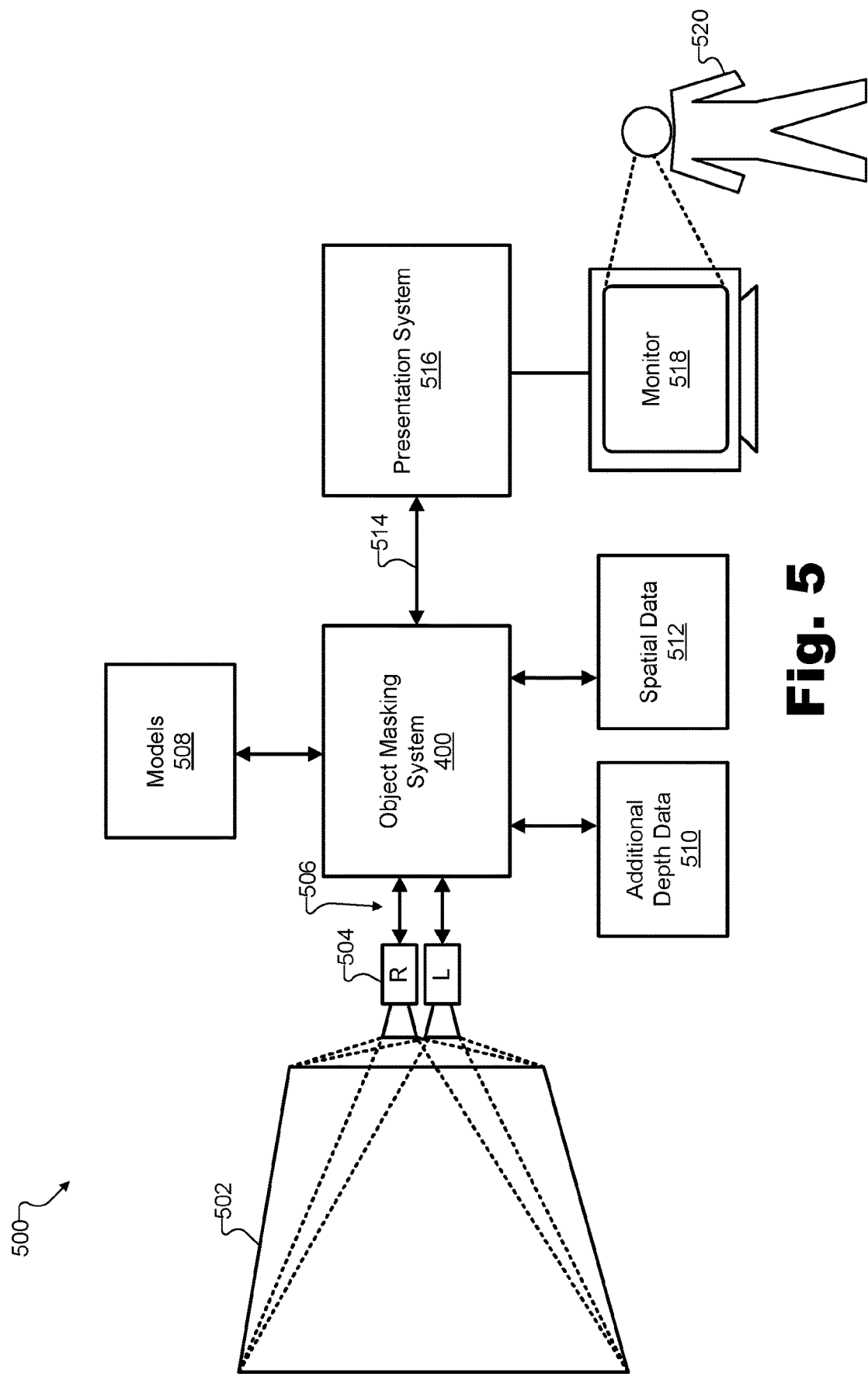
FIG. 5 illustrates an exemplary configuration within which the object masking system of FIG. 4 may operate to mask a recognized object during an application of a synthetic element to an original image according to principles described herein.

FIG. 5 illustrates an exemplary configuration 500 within which system 400 may operate to mask a recognized object during an application of a synthetic element to an original image. Specifically, as will be described in more detail below, configuration 500 depicts a scene 502 that is captured by an image capture device 504 to generate image data 506 that is provided to or otherwise accessed by system 400. Using one or more models 508, together with, in certain implementations, some additional depth data 510 and/or spatial data 512, system 400 generates a set of presentation data 514 that is provided to or otherwise accessed by a presentation system 516. Presentation system 516 presents augmented versions of image data 506 (e.g., augmented reality images based on image data 506) by way of a monitor 518 to a user 520. Each of the components of configuration 500 will now be described in relation to FIG. 5, as well as with reference to FIGS. 6-8.

Scene 502 may be implemented as any type of real-world (as opposed to purely virtual) scene, worksite, location, area, or other type of scene that is subject to being captured (e.g., photographed, video recorded, etc.) by an image capture device such as image capture device 504. In some examples, scene 502 may be a real-world scene that is large or small, exists indoors or outdoors, and includes any of the types of objects and/or scenery described herein (e.g., people, cars, homes, furniture, etc.). In other examples, as will be described in more specific detail below with reference to FIGS. 9 and 10, scene 502 may be associated with a specialized real-world scene such as a surgical site within a body upon which a surgical procedure is being performed (e.g., a body of a live human patient, a cadaver, a training fixture, an animal, etc.).

Image capture device 504 may be implemented as any suitable device for capturing imagery at scene 502. For instance, if scene 502 is a relatively large-scale real-world scene such as an outdoor scene, a home, a workplace, or the like, image capture device 504 may be implemented as a camera (e.g., a still camera, a video camera, etc.). Such a camera may be a monoscopic camera capturing imagery of scene 502 from a single vantage point or, as illustrated by the twin right ("R") and left ("L") elements of image capture device 504, may be a stereoscopic camera capturing imagery of scene 502 from stereoscopic vantage points (illustrated using dotted lines extending from respective elements of image capture device 504 to the corners of scene 502). In still other examples, image capture device 504 may have additional elements configured to allow image capture device 504 to capture wider angle images such as panoramic images (e.g., 360° images, spherical images, etc.) or the like.

As will be described in more detail below in relation to FIGS. 9 and 10, certain implementations of system 400 may be implemented in the context of computer-assisted surgical procedures. In such implementations, image capture device 504 may be implemented as an endoscope (e.g., a monoscopic or stereoscopic endoscope) or another suitable medical imaging modality configured to capture imagery at a surgical site implementing or included within scene 502.

Image data 506 is shown to be communicated between image capture device 504 and system 400. For example, image data 506 may represent images captured by image capture device 504 (e.g., raw images such as image 100), instructions for capturing such images (e.g., commands to capture images, synchronization information, etc.), or any other image-related information that is communicated between system 400 and image capture device 504. Depending on the use case or application, images represented by image data 506 may be various types of images and may include various types of imagery as may serve a particular implementation.

For instance, in certain implementations, image data 506 may represent a still image such as a photograph captured by image capture device 504. In some examples, such an image may include a set of distinct images captured at approximately the same time of approximately the same portion of scene 502. For instance, a stereoscopic image may include two or more similar images captured simultaneously from different vantage points such that depth information may be derived from differences between the images. In other examples, a still image may include a set of distinct images captured (e.g., at the same or different times) of overlapping portions of scene 502 so as to be combinable to form a panoramic image (e.g., a 360° image, a spherical image, etc.). In these or other implementations, image data 506 may represent a video image consisting of a sequence of image frames (i.e., images of the same scene 502 that are captured in sequence at consecutive times such as by a video camera). Each image frame in such a video image may depict objects at scene 502 (e.g., including recognized objects) as the objects move with respect to a remainder of the imagery depicted in the image.

As described in detail above in relation to FIG. 4, system 400 may be configured to perform various operations to associate a model with a recognized object and to generate presentation data representative of a masking of a recognized object based on the model as associated with the recognized object. For example, system 400 may receive or otherwise access image data 506 from image capture device 504 and, analyzing an image represented in this image data, may identify a recognized object for which a model (e.g., a 3D model) is available in models 508. Models 508 may represent a repository of models (e.g., 2D models, 3D models, etc.) that is included within system 400 (e.g., stored within storage facility 402) or that is stored in a repository (e.g., a database or other such data store) that is communicatively coupled and accessible to system 400.

Models 508 may each be any type of representation of an object that is generated prior to the moment, at runtime, when system 400 is performing operations to generate a depth map and to analyze images being captured of scene 502 to generate presentation data 514. For example, models 508 may represent CAD models that represent certain objects in detail. Such CAD models may be used in the design of various types of objects and may be made available when the objects are purchased and used. For instance, surgical instruments may be associated with highly detailed and accurate CAD models that are available for use by people and systems that use the surgical instruments. In other examples, models 508 may represent detailed, high-density scans (e.g., 3D scans) of objects that have been performed previously (e.g., prior to runtime during a period when limitations of real-time processing described herein are relaxed). For instance, a 3D scanner may be used to generate high-density 3D models of various types of objects that are anticipated to be part of a particular augmented reality experience and that are desirable to be in the foreground (i.e., in front of augmented reality overlays) in the augmented reality experiences.

Based on image data 506 and one or more of models 508, system 400 may associate the model or models with one or more recognized objects depicted in image data 506 and use this association to perform other analysis of the original image of scene 502. For instance, once the model is associated with the depicted recognized object in the original image, system 400 may accurately segment the original image to distinguish pixels of the image that depict the one or more recognized objects from pixels that do not depict the one or more recognized objects. This segmentation of an image represented by image data 506 may be performed in any suitable manner, including by using a semantic scene segmentation technique in which each pixel in an image is designated as corresponding to one particular object or set of imagery (e.g., a recognized object such as object 102, another object such as one of objects 104, another part of the imagery such as background 106, etc.).

For certain images and to at least some extent, image segmentation may be performed exclusively based on data representative of colors and/or shades of each point on the surface of objects and scenery captured within image data 506 (i.e., what is captured when light reflecting or originating at such points is captured by image capture device 504). This type of data will be referred to herein as color data, even though it will be understood that such color data may, in certain examples, be implemented by grayscale image data, infrared image data, or other types of image data not explicitly associated with visible colors. While color data may be of use in performing image segmentation, color data alone may fail to provide a sufficient basis upon which to perform accurate, detailed, and real-time segmentation of certain images. In such examples, depth data may be used instead of or in addition to color data to accurately and efficiently segment an image. While color data represents the appearance (e.g., color, texture, etc.) of surface points of objects at a site, depth data represents the location of the surface points (i.e., the depth of the surface points, how far away each surface point is from a vantage point, etc.) relative to a certain location such as a vantage point associated with the image capture device.

Accordingly, system 400 may generate a depth map of the imagery depicted by the image captured by image capture device 504 and represented by image data 506. Such a depth map may be generated based on one or more models 508 that have been associated with (e.g., registered with or otherwise tied to or made to correspond to) one or more recognized objects in the scene, as well as, in certain examples, additional depth data 510, spatial data 512, and/or other data as may serve a particular implementation. The depth map may include first depth data for a depiction of the recognized object within the imagery and second depth data for a remainder of the imagery. For example, if the image is image 100 and object 102 is the recognized object, system 400 may use a model 508, additional depth data 510, and/or spatial data 512 to generate a depth map that includes detailed depth data for object 102 (e.g., depth data around level "9" in the example of FIG. 3) and additional depth data for objects 104 and/or background 106 (e.g., depth data around levels "0"-"3" in the example of FIG. 3).

The first depth data (e.g., the depth data for object 102), may be denser than the second depth data, and may be based on one or more of models 508 described above (e.g., a 3D model for object 102) and based on spatial data 512 that has been used to register or otherwise associate the model with object 102 (e.g., camera calibration data for image capture device 504, kinematic data indicative of the position and/or orientation of object 102 with respect to image capture device 504, etc.). The second depth data may be generated or accessed from additional depth data 510 using conventional real-time technologies and techniques (e.g., stereoscopic depth detection by stereoscopic image capture device 504, time-of-flight depth detection performed by a time-of-flight scanner built into or otherwise associated with image capture device 504, SLAM technologies, monoscopic SfM technologies, etc.).

Once the depth map is generated, system 400 may use the depth map to segment the original image to distinguish pixels of the original image that depict object 102 (the recognized object) from pixels of the original image that do not depict object 102. For example, this segmentation may be performed by identifying the pixels of the image that depict object 102 based on the first depth data, and by identifying the pixels of the image that do not depict the recognized object based on the second depth data. Based on the segmentation of an image performed in the ways described herein, or based on other operations that do not involve an explicit segmentation such as has been described, system 400 may generate presentation data 514 and, in certain examples such as illustrated in configuration 500, may provide the generated presentation data to presentation system 516 for use in presenting an augmented version of the original image (e.g., an augmented reality image) to user 520.

As has been mentioned, in certain examples, system 400 may generate presentation data 514 as image data representative of the augmented version of the original image and that is immediately renderable by presentation system 516. In other examples, however, system 400 may generate presentation data 514 in another form configured to facilitate presentation system 516 in other ways to present the augmented version of the original image. For example, in certain implementations, presentation data 514 may include the original image data (e.g., image data 506) as well as generated masking data and/or other data (e.g., metadata, data representative of synthetic elements that are to be used as augmentations to augment the original image, etc.) that serves to direct presentation system 516 itself to construct and present the augmented version of the original image.

Figure 6:
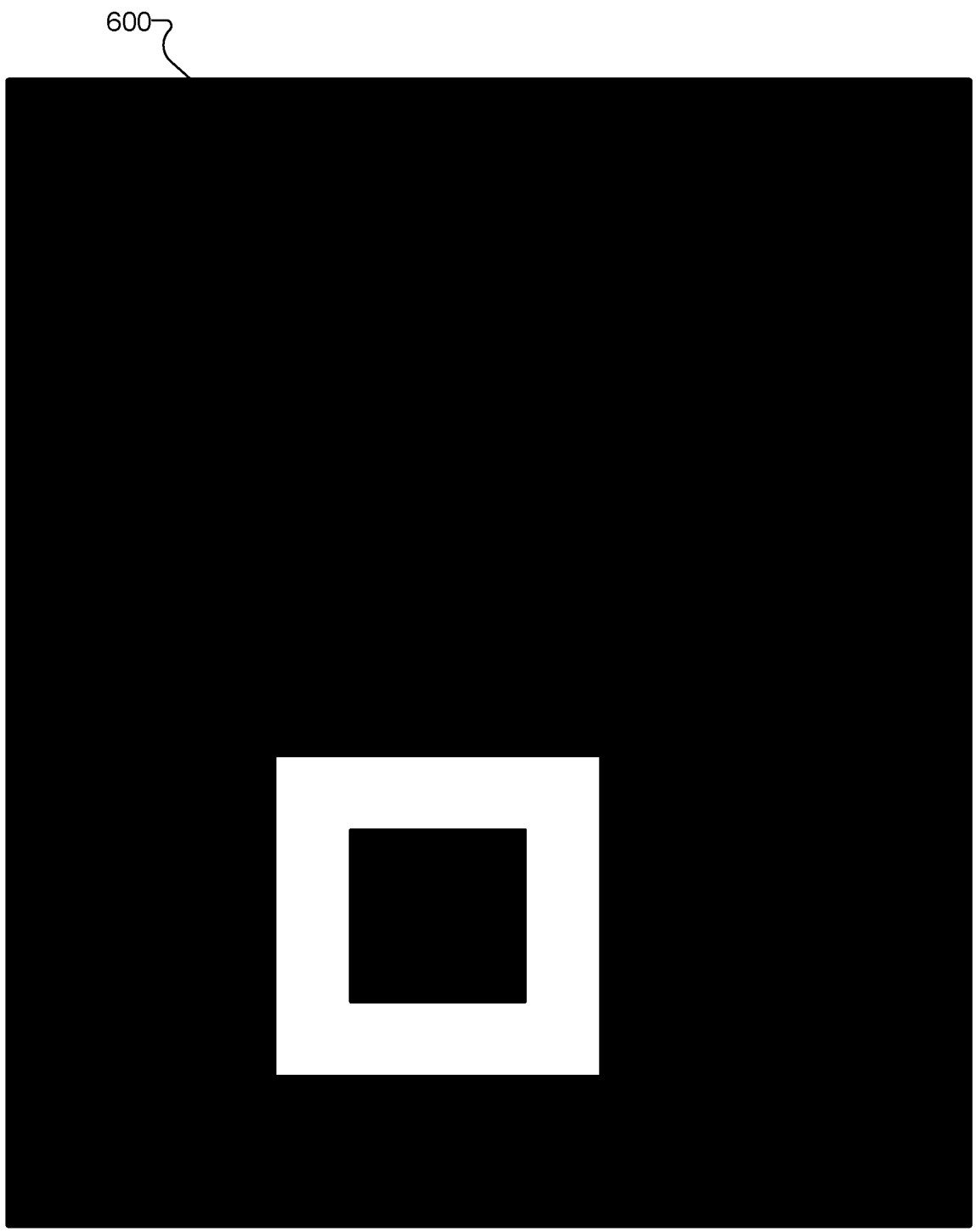
FIG. 6 illustrates an exemplary representation of masking data representative of a segmented image and configured for use by a presentation system according to principles described herein.

FIG. 6 illustrates an exemplary representation 600 of such masking data that may be included in presentation data 514. Specifically, representation 600 includes black and white pixels associated with each of the original pixels of image 100. As shown, the white pixels in representation 600 correspond to pixels of image 100 that have been determined to correspond to object 102 (i.e., the recognized object in this example) based on the association of the model 508 with the recognized object and the resultant dense segmentation of the object from the remainder of the imagery. In contrast, the black pixels in representation 600 correspond to pixels of image 100 that have been determined, based on this same segmentation, to correspond to objects or imagery other than object 102 (e.g., objects 104, background 106, etc.). While black and white pixels are used to depict masking data 514 in representation 600, it will be understood that masking data 514 may take any suitable form as may be useful to indicate to a presentation system which pixels of an image correspond to a recognized object and which pixels do not. For example, the black and white colors may be switched in certain examples, other colors may be used, or another data structure that indicates whether each pixel does or does not depict the recognize object may be employed.

System 400 may generate a mask such as illustrated by representation 600 that can be applied to a synthetic element (e.g., an augmented reality overlay) such as synthetic element 202. When such a mask is applied, pixels of synthetic element 202 may be subtracted or removed from synthetic element 202 if the pixels are to be covered by object 102 (i.e., made to appear to be behind object 102).

Figure 7:
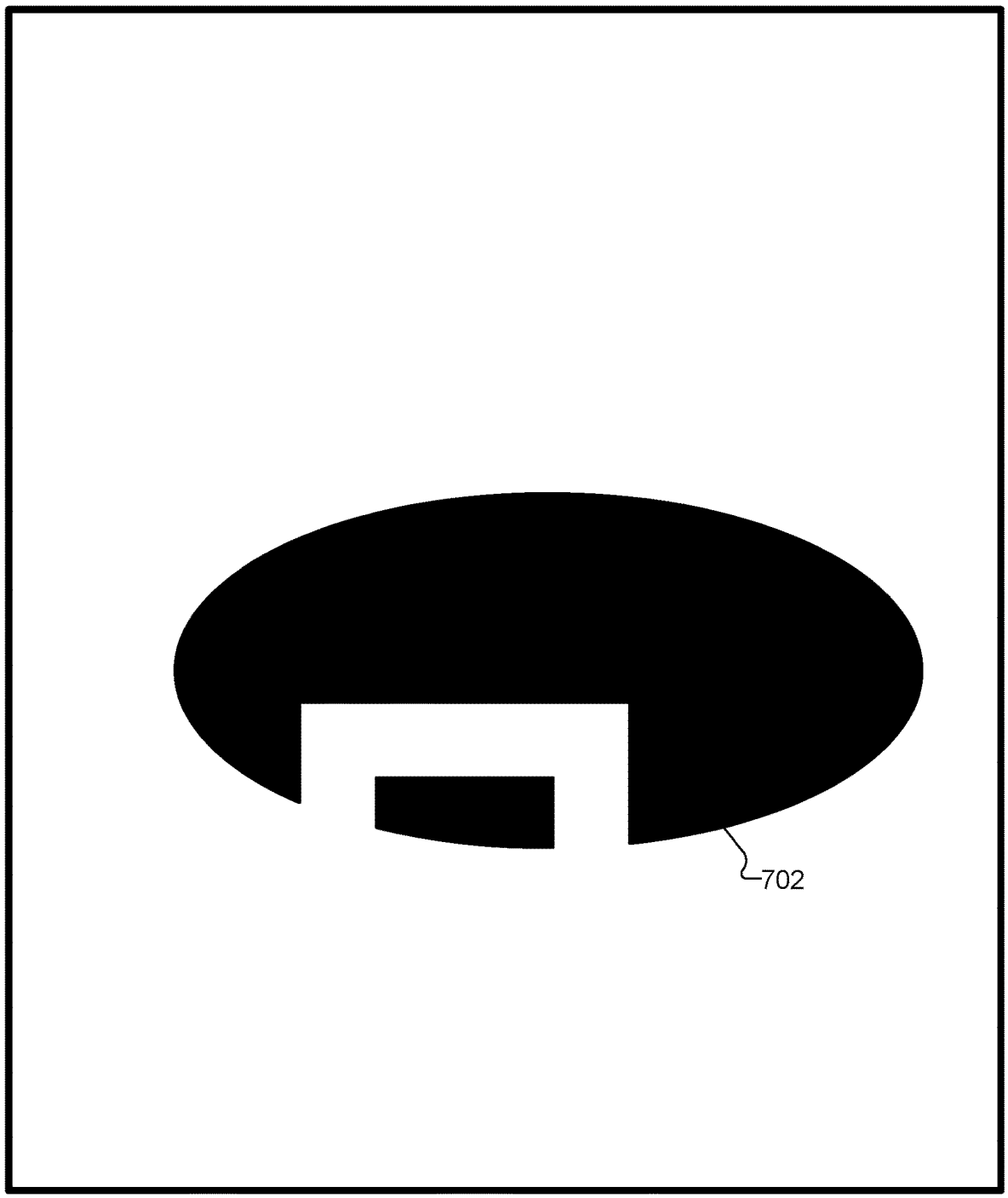
FIG. 7 illustrates an exemplary synthetic element after the masking data of FIG. 6 is applied to the synthetic element according to principles described herein.

To illustrate, FIG. 7 shows a synthetic element 702. Synthetic element 702 will be understood to be a version of synthetic element 202 described above that is to be overlaid onto image 100 at the same location as illustrated in FIG. 2. However, as shown, synthetic element 702 is depicted after the exemplary masking data illustrated by representation 600 in FIG. 6 has been applied to synthetic element 202. Accordingly, pixels of synthetic element 202 that are to be depicted to be behind object 102 have been removed or masked out of synthetic element 702.

To illustrate how the segmentation performed by system 400 based on the model 508 may improve the masking of recognized object 102 during an application of an augmented reality overlay, FIG. 3 described above may be compared to FIG. 8.

Figure 8:
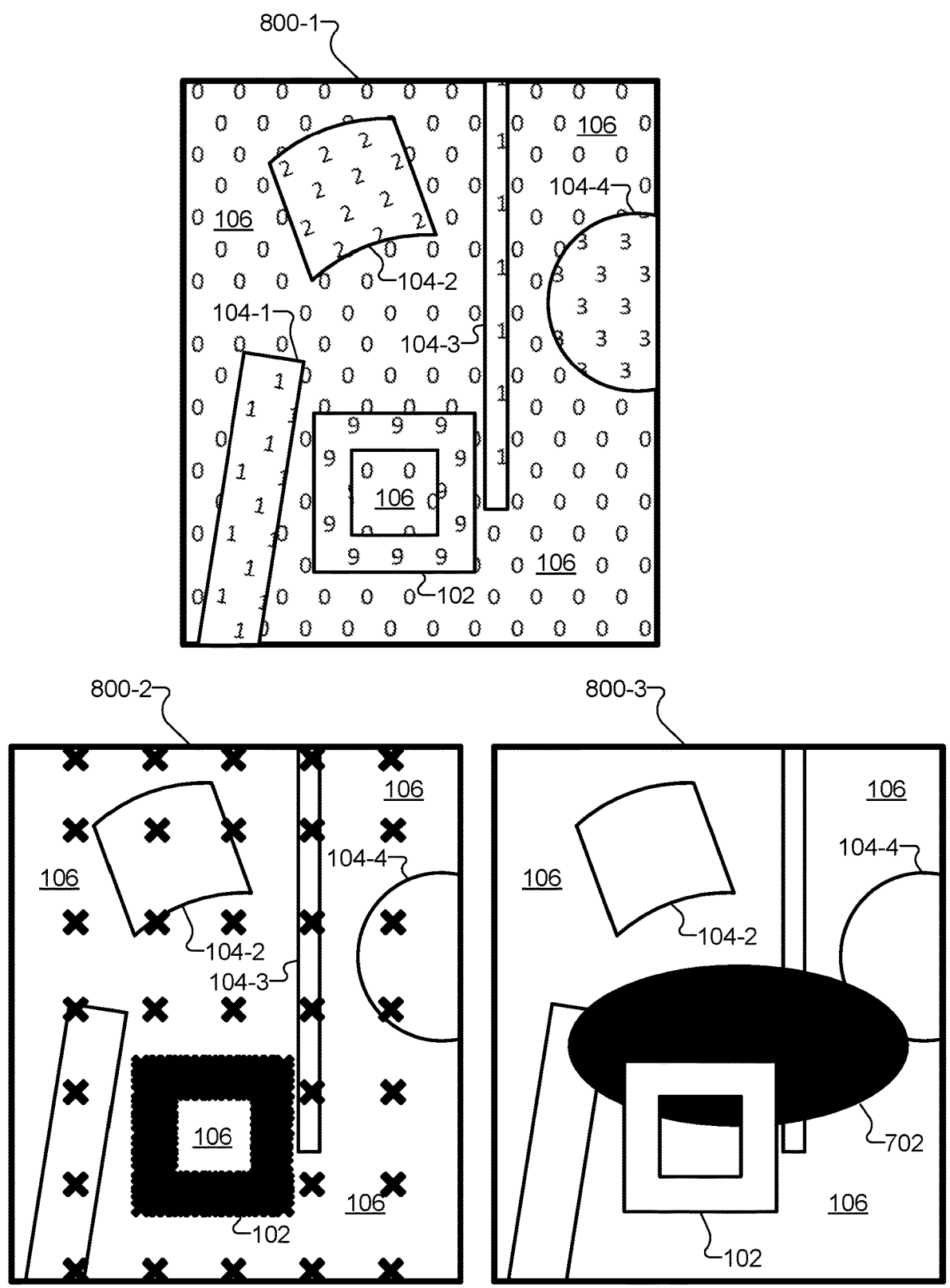
FIG. 8 illustrates exemplary aspects of how depth data, including depth data from a model of a recognized object, may be detected and used to improve the masking of the recognized object as the synthetic element is applied to the original image according to principles described herein.

Like FIG. 3, FIG. 8 illustrates exemplary aspects of how depth data may be detected and used to mask object 102 as a synthetic element is applied to an original image to form an augmented version of the original image. However, in contrast to FIG. 3, FIG. 8 illustrates an example in which depth data from a model 508 of a recognized object is used together with conventional depth data (e.g., additional depth data 510) to improve the segmentation and masking of recognized object 102 as the synthetic element is applied.

Specifically, a representation 800-1 in FIG. 8 shows the same actual depth data for the objects and imagery of image 100 as illustrated in representation 300-1 in FIG. 3, a representation 800-2 shows how first and second depth data of different densities are combined in a single depth map for the objects and imagery of image 100, and a representation 800-3 shows an implementation of augmented reality image 200 in which synthetic element 702 is depicted in a manner that actually appears to be located behind object 102. Each of representations 800 (i.e., representations 800-1 through 800-3) will now be described in more detail.

Representation 800-1 depicts actual depth data for each of objects 102 and 104, as well as for background 106, in image 100. Representation 800-1 is the same as representation 300-1 and, as described above, uses the simple notation of a 1-digit number (e.g., 0, 1, 2, etc.) to differentiate areas of image 100 that depict imagery located at different depths with respect to an image capture device that captured image 100. As described above in relation to FIG. 3, it may not be possible or practical for a highly detailed or dense depth map to be generated in real time to capture all the nuance of the actual depth data shown in representation 800-1.

As with representation 300-2 above, representation 800-2 illustrates the consequence of some of the practical limitations imposed by real-time depth detection using conventional depth detection techniques. As in representation 300-2, depth is not captured for image 100 at every point (e.g., every pixel) but, rather, is only detected at each point of image 100 demarcated by a black "x" in representation 800-2. While the density of the depth map is the same in representation 800-2 as in representation 300-2 for objects 104 and background 106, FIG. 8 shows that the density of the depth map for recognized object 102 may be very different in representation 800-2 than in representation 300-2. Specifically, the black "x"s are shown to be so dense on object 102 that they cannot even be distinguished from one another in FIG. 8 (making object 102 appear almost as a solid black box). This is because depth data for recognized object 102 is not based on (or at least is not exclusively based on) real time depth detection techniques performed for the rest of the imagery in image 100. Instead, as described above, the depth data ("first depth data") for recognized object 102 is generated based on a model 508 of object 102 that represents object 102 in a great amount of detail and that has been registered or otherwise associated with object 102 in image 100 so that the detail of object 102 need not be scanned and determined in real time. Because the depth data for object 102 is so dense, representation 800-2 illustrates that each edge of object 102 may be well defined by system 400 so as to be able to generate presentation data that either depicts an accurately applied masking of the proper portions of synthetic element 202, or that at least includes very accurate masking data (see FIG. 6) that enables presentation system 516 to accurately apply the masking data to synthetic element 202 (see FIG. 7).

The result of this, and some of the benefits thereof, are illustrated in representation 800-3. As shown, a section of augmented reality overlay 202 has been masked to form synthetic element 702, which very accurately and precisely accounts for object 102 so as to not cover object 102. As a result, representation 800-3 provides a much more convincing representation of recognized object 102 being in front of the augmented reality overlay than does representation 300-3. As shown in representation 800-3, synthetic element 702 is well aligned so as to convincingly appear to be located behind (i.e., to be occluded by) object 102, while still being located in front of (i.e., still serving to occlude) objects 104 and background 106.

As captured imagery at scene 502 dynamically changes (e.g., as objects 102 and 104 move with respect to background 106, etc.), it may be desirable to track recognized object 102 from frame to frame in a video image so that presentation data can be continuously updated to provide the appearance that object 102 is in front of synthetic element 202 even when object 102 and/or the synthetic element are in motion. To this end, system 400 may be configured to continually identify recognized object 102 within the imagery depicted by a video image by initially recognizing recognized object 102 in a first image frame of a sequence of image frames, and tracking (e.g., based on the initial recognition) recognized object 102 from image frame to image frame as recognized object 102 moves with respect to the remainder of the imagery in later image frames of the sequence of image frames. For example, recognized object 102 may be identified in a first image frame of a video image represented by image data 506 by way of computer vision and/or object recognition techniques that rely on color data, depth data, previous recognition of object 102 (e.g., machine learning), and so forth. Once object 102 has been identified, system 400 may avoid having to perform the object recognition techniques again for every frame by tracking object 102 as the object moves gradually at scene 502 from frame to frame.

Returning to FIG. 5, spatial data 512 may also be received or otherwise accessed by system 400 to assist in initially recognizing object 102 in the first image frame, tracking object 102 from frame to frame in the later image frames, associating one of models 508 with object 102, segmenting images based on this association between the model 508 and object 102 (as described above), and/or for any other uses as may serve a particular implementation. More particularly, spatial data 512 may include any of various types of data used to determine the spatial characteristics of a recognized object, particularly in relation to image capture device 504 and images being captured by image capture device 504. For example, spatial data 512 may include data associated with computer vision and/or object recognition techniques (e.g., including techniques that leverage machine learning and are trained using data obtained from imagery captured and analyzed in the past). Thus, while models 508 may be configured to define geometric details of recognized object 102, spatial data 512 may be generated or accessed to associate how the model 508 relates to object 102 in the image. For example, spatial data 512 may include any of various types of data representative of a spatial pose of recognized object 102 (i.e., information about precisely where and how recognized object 102 is positioned with respect to scene 502 and/or image capture device 504 at any given moment).

In certain implementations, spatial data 512 may include kinematic data that is tracked by a computer-assisted medical system configured to move robotic arms to perform robotically-assisted surgery in certain examples described herein. In such examples, precise kinematic data may be available for each robotic arm and any surgical instrument or other object held by such a robotic arm in order to allow precise control of the robotic arms by a user (e.g., a surgeon or the like). Accordingly, by accessing kinematic data included within spatial data 512, system 400 may identify the recognized object (e.g., including initially recognizing the object, later tracking of the object, etc.) based at least in part on this kinematic data, and may determine precisely how the recognized object is positioned, oriented, and so forth, to associate the model 508 with the recognized object.

In the same or other implementations, spatial data 512 may be configured to support other methodologies besides kinematic-based methods of identifying objects and/or determining the positions and orientations of the objects. For instance, certain implementations may rely on computer vision techniques as described above, and spatial data 512 may include data configured to support the computer vision techniques (e.g., training datasets used for machine learning, etc.). As another example, certain implementations may involve a recognized object in which an electromagnetic tracker is embedded and the position and orientation of the recognized object is tracked by monitoring the movement of the electromagnetic tracker through an electromagnetic field. In this example, spatial data 512 may include data associated with the electromagnetic field and/or position, orientation, and movement of the electromagnetic tracker within the field.

Together with providing data representative of the position and orientation of objects (e.g., including recognized objects) at scene 502, spatial data 512 may also include camera calibration data for image capture device 504. For instance, spatial data 512 may include data representative of intrinsic or extrinsic parameters of image capture device 504, including data representative of the focal length of image capture device 504, lens distortion parameters for image capture device 504, the principal point of image capture device 504, and so forth. Such data may facilitate accurate generation of a dense portion of a depth map used for generating presentation data (e.g., distinguishing the recognized object, segmenting the image, generating masking data, etc.) once the position and orientation of the recognized object have been determined. This is because the camera calibration parameters may allow system 400 to precisely associate the model with the recognized object by determining precisely how the recognized object is depicted in images captured by image capture device 504 for a given position and orientation of the recognized object with respect to image capture device 504.

Presentation system 516 may receive presentation data 514 from system 400 and present (e.g., render) the presentation data or construct a renderable image based on presentation data 514 as may be appropriate for the nature of the provided presentation data 514. For example, if presentation data 514 includes masking data such as illustrated by representation 600 in FIG. 6, presentation system 516 may apply a mask represented by the masking data to a synthetic element to be integrated with an original image to form an augmented version of the original image (i.e., an augmented reality image) to be presented by way of monitor 518 to user 520. For example, as illustrated in representation 800-3 of FIG. 8, presentation system 516 may present an augmented reality image that depicts synthetic element 702 to be located behind recognized object 102. To this end, presentation system 516 may be implemented by any suitable presentation system configured to present an augmented reality experience or other such experience to a user, including, but not limited to, an augmented reality media player device (e.g., a dedicated, head-mounted augmented reality device, etc.), a standard mobile device such as a smartphone that may be held at arm's length or mounted on the head by way of an apparatus, a surgeon console or auxiliary console of a computer-assisted medical system such as will be described in more detail below, or any other suitable presentation system. In some examples, presentation system 516 may be incorporated into (i.e., built into, integrated with, etc.) system 400, while, in other examples, presentation system 516 may be separate from but communicatively coupled with system 400.

Monitor 518 may be any suitable type of presentation screen or other monitor (or a plurality thereof) that is configured to present augmented reality images to user 520. In some examples, monitor 518 may be implemented by a computer monitor, television, device screen of a smartphone or tablet, or the like. In other examples, monitor 518 may be implemented by a pair of small display screens configured to present imagery to each eye of user 520 (e.g., a head worn augmented reality device, a surgeon console that presents stereoscopic imagery, etc.). As such, user 520 may represent any person who experiences content (e.g., augmented reality content) presented by presentation system 516 based on data received from system 400. For example, user 520 may be a person playing an augmented reality game or using another type of extended reality application, a surgeon or surgical team member helping to perform a surgical procedure, or any other suitable person experiencing the content presented by presentation system 516.

Presentation system 516 may present, based on presentation data 514, an augmented version of an original image in any way that is suitable to prevent augmentation content such as a synthetic element added to the original image from occluding (fully or partially occluding) a recognized object depicted in the original image. In certain examples, for instance, presentation system 516 may present, based on presentation data 514, an augmented image that includes the original image augmented with only a portion of the synthetic element (or only a portion of other augmentation content). The displayed portion of the synthetic element may be any portion of the synthetic element, such as a portion made up of contiguous pixels or an aggregate portion made up of non-contiguous pixels (e.g., separate groups of contiguous pixels that together make up the portion). By presenting only a portion of the synthetic element in the augmented image, presentation system 516 omits a different portion of the synthetic element from the augmented image. For example, instead of presenting pixels associated with the omitted portion of the synthetic element, presentation system 516 may present pixels associated with the recognized object to prevent occluding the recognized object with the omitted portion of the synthetic element. The pixels to be presented or not presented in the augmented image may be identified by presentation system 516 based on presentation data 514 in any suitable way, including by performing any of the masking operations described herein.

Throughout the above description, various types of use cases have been described, all of which may be well served by system 400 and the systems and methods described herein for masking a recognized object during an application of a synthetic element to an original image. As has been mentioned, one specific example related to computer-assisted surgical procedures will now be described in more detail. System 400 and principles thereof that are described herein may be especially well adapted for such augmented-reality-assisted surgery examples for reasons that will be made apparent.

As used herein, a surgical procedure may include any medical procedure, including any diagnostic, therapeutic, or treatment procedure in which manual and/or instrumental techniques are used on a body of a patient or other subject to investigate or treat a physical condition. A surgical procedure may refer to any phases of a medical procedure, such as preoperative, operative (i.e., intraoperative), and postoperative phases of a surgical procedure.

In such applications of the systems and methods described herein, scene 502 will be understood to be implemented as a surgical site that includes any volumetric space associated with a surgical procedure. For example, the surgical site may include any part or parts of a body of a patient or other subject of the surgery in a space associated with the surgical procedure. The surgical site may, in certain examples, be entirely disposed within the body and may include a space within the body near where a surgical procedure is planned to be performed, is being performed, or has been performed. For example, for a minimally invasive surgical procedure being performed on tissue internal to a patient, the surgical site may include the surface tissue, anatomy underlying the surface tissue, as well as space around the tissue where, for example, surgical instruments being used to perform the surgical procedure are located. In other examples, the surgical site may be at least partially disposed external to the patient. For instance, for an open surgical procedure being performed on a patient, part of the surgical site (e.g., tissue being operated on) may be internal to the patient while another part of the surgical site (e.g., a space around the tissue where one or more surgical instruments may be disposed) may be external to the patient.

Figure 9:
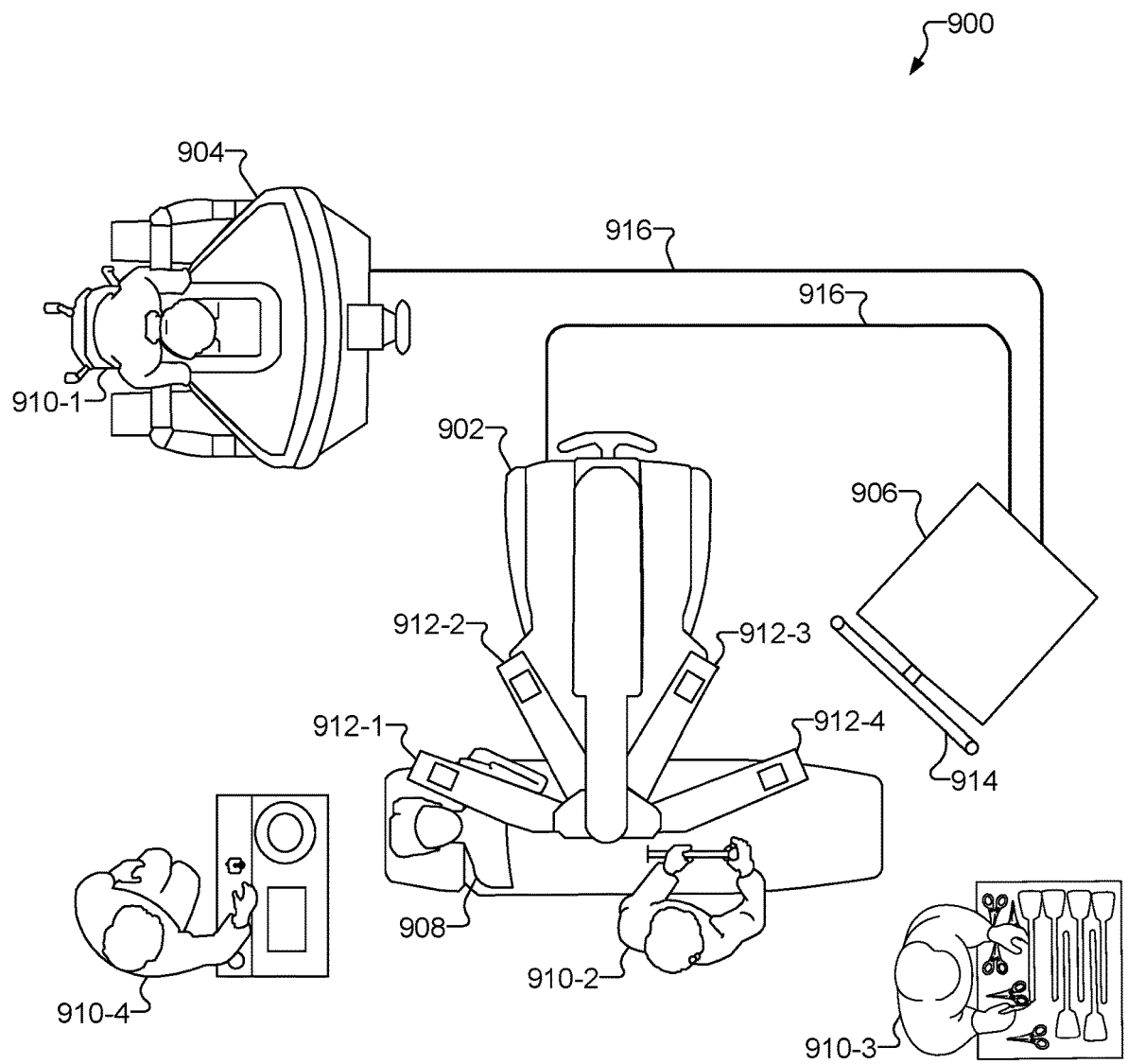
FIG. 9 illustrates an exemplary computer-assisted surgical system according to principles described herein.

FIG. 9 shows an exemplary computer-assisted surgical system 900 ("surgical system 900"). As has been mentioned, system 400 may be implemented by or within surgical system 900, or may be separate from but communicatively coupled to surgical system 900. For example, system 400 may receive input from and provide output to surgical system 900 and/or may access imagery of a surgical site, information about the surgical site, and/or information about surgical system 900 from surgical system 900. System 400 may use this accessed imagery and/or information to perform any of the processing described herein to generate composite imagery of the surgical site, and provide data representative of the composite imagery to surgical system 900 for display.

As shown, surgical system 900 may include a manipulating system 902, a user control system 904 (also referred to herein as a surgeon console), and an auxiliary system 906 (also referred to herein as an auxiliary console) communicatively coupled one to another. Surgical system 900 may be utilized by a surgical team to perform a computer-assisted surgical procedure on a patient 908. As shown, the surgical team may include a surgeon 910-1, an assistant 910-2, a nurse 910-3, and an anesthesiologist 910-4, all of whom may be collectively referred to as "surgical team members 910." Additional or alternative surgical team members may be present during a surgical session as may serve a particular implementation.

While FIG. 9 illustrates an ongoing minimally invasive surgical procedure, it will be understood that surgical system 900 may similarly be used to perform open surgical procedures or other types of surgical procedures that may similarly benefit from the accuracy and convenience of surgical system 900. Additionally, it will be understood that the surgical session throughout which surgical system 900 may be employed may not only include an operative phase of a surgical procedure, as is illustrated in FIG. 9, but may also include preoperative, postoperative, and/or other suitable phases of the surgical procedure.

As shown in FIG. 9, manipulating system 902 may include a plurality of manipulator arms 912 (e.g., manipulator arms 912-1 through 912-4) to which a plurality of surgical instruments (e.g., surgical instruments that, as described above, may be identified by system 400 to be recognized objects having respective models 508 available)

may be coupled. Each surgical instrument may be implemented by any suitable therapeutic instrument (e.g., a tool having tissue-interaction functions), imaging device (e.g., an endoscope, an ultrasound tool, etc.), diagnostic instrument, or the like that may be used for a computer-assisted surgical procedure on patient 908 (e.g., by being at least partially inserted into patient 908 and manipulated to perform a computer-assisted surgical procedure on patient 908). In some examples, one or more of the surgical instruments may include force-sensing and/or other sensing capabilities. In some examples, a surgical instrument may be implemented by an ultrasound module or such an ultrasound module may be connected to or coupled with one of the other surgical instruments described above. While manipulating system 902 is depicted and described herein as including four manipulator arms 912, it will be recognized that manipulating system 902 may include only a single manipulator arm 912 or any other number of manipulator arms as may serve a particular implementation.

Manipulator arms 912 and/or surgical instruments attached to manipulator arms 912 may include one or more displacement transducers, orientational sensors, and/or positional sensors used to generate raw (i.e., uncorrected) kinematics information. For example, such kinematic information may be represented by kinematics data included within spatial data 512 described above. As has been mentioned, system 400 and/or surgical system 900 may be configured to use the kinematics information to track (e.g., determine positions of) and/or control the surgical instruments (as well as anything held by or connected to the instruments such as a needle, an ultrasound module, a retracted piece of tissue, etc.).

User control system 904 may be configured to facilitate control by surgeon 910-1 of manipulator arms 912 and surgical instruments attached to manipulator arms 912. For example, surgeon 910-1 may interact with user control system 904 to remotely move or manipulate manipulator arms 912 and the surgical instruments. To this end, user control system 904 may provide surgeon 910-1 with imagery of a surgical site (e.g., scene 502) associated with patient 908 as captured by an image capture device (e.g., image capture device 504). In certain examples, user control system 904 may include a stereo viewer having two displays where stereoscopic images of a surgical site associated with patient 908 and generated by a stereoscopic imaging system may be viewed by surgeon 910-1. As mentioned above, in certain examples, augmented reality imagery generated by system 400 or presentation system 516 may be displayed by user control system 904. In such instances, surgeon 910-1 may utilize the imagery displayed by user control system 904 to perform one or more procedures with one or more surgical instruments attached to manipulator arms 912.

To facilitate control of surgical instruments, user control system 904 may include a set of master controls. These master controls may be manipulated by surgeon 910-1 to control movement of surgical instruments (e.g., by utilizing robotic and/or teleoperation technology). The master controls may be configured to detect a wide variety of hand, wrist, and finger movements by surgeon 910-1. In this manner, surgeon 910-1 may intuitively perform a procedure using one or more surgical instruments, Auxiliary system 906 may include one or more computing devices configured to perform primary processing operations of surgical system 900. In such configurations, the one or more computing devices included in auxiliary system 906 may control and/or coordinate operations performed by various other components (e.g., manipulating system 902 and user control system 904) of surgical system 900. For example, a computing device included in user control system 904 may transmit instructions to manipulating system 902 by way of the one or more computing devices included in auxiliary system 906. As another example, auxiliary system 906 may receive (e.g., from manipulating system 902) and may process image data representative of imagery captured by an image capture device such as image capture device 504.

In some examples, auxiliary system 906 may be configured to present visual content to surgical team members 910 who may not have access to the images provided to surgeon 910-1 at user control system 904. To this end, auxiliary system 906 may implement monitor 518 of FIG. 5 by including a display monitor 914 configured to display one or more user interfaces and/or augmented reality images of the surgical site, information associated with patient 908 and/or the surgical procedure, and/or any other visual content as may serve a particular implementation. For example, display monitor 914 may display augmented reality images of the surgical site that includes live video capture together with augmentations such as textual and/or graphical content (e.g., anatomical models generated preoperatively, contextual information, etc.) concurrently displayed with the images. In some embodiments, display monitor 914 is implemented by a touchscreen display with which surgical team members 910 may interact (e.g., by way of touch gestures) to provide user input to surgical system 900.

Manipulating system 902, user control system 904, and auxiliary system 906 may be communicatively coupled one to another in any suitable manner. For example, as shown in FIG. 9, manipulating system 902, user control system 904, and auxiliary system 906 may be communicatively coupled by way of control lines 916, which may represent any wired or wireless communication link as may serve a particular implementation. To this end, manipulating system 902, user control system 904, and auxiliary system 906 may each include one or more wired or wireless communication interfaces, such as one or more local area network interfaces, Wi-Fi network interfaces, cellular interfaces, etc.

To apply principles described herein to the surgical context described in relation to FIG. 9, several concepts that have been described and illustrated in relatively general terms above may be applied specifically to the surgical context. For instance, in augmented-reality-enhanced surgical procedure examples, the imagery depicted by the image may be imagery of a surgical site at which a surgical procedure is being performed by way of a computer-assisted surgical instrument, the recognized object may be the computer-assisted surgical instrument, and the augmented reality overlay depicted to be located behind the computer-assisted surgical instrument may be an anatomical model generated prior to the surgical procedure using a preoperative imaging modality.

Figure 10:
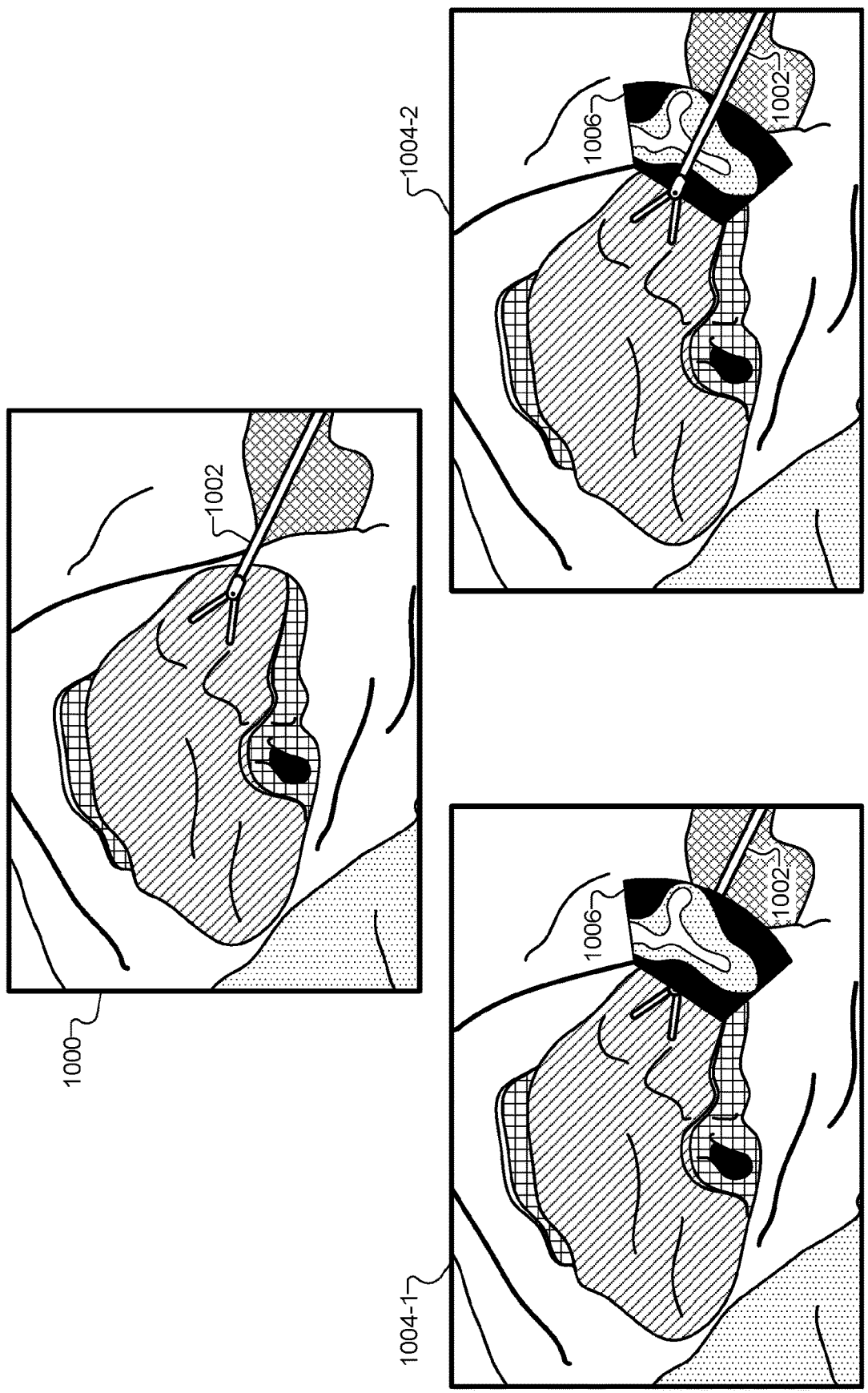
FIG. 10 illustrates exemplary aspects of masking a recognized object during an application of a synthetic element to an original image depicting a surgical site during a surgical procedure performed using the computer-assisted surgical system of FIG. 9 according to principles described herein.

To illustrate, FIG. 10 shows exemplary aspects of masking a recognized object during an application of a synthetic element to an original image in a specific scenario involving a surgical procedure performed using surgical system 900. Specifically, as shown, an image 1000 depicts a surgical scene including tissue and other anatomical structures being manipulated or otherwise surgically operated on by way of a surgical instrument 1002. Image 1000 represents a raw image to which no augmentation has been applied (e.g., analogous to image 100 described above in more general terms).

FIG. 10 further includes two images 1004 (i.e., images 1004-1 and 1004-2) to demonstrate the consequence and benefits of employing the systems and methods described herein. Images 1004 may each represent processed images that employ augmented reality or other such extended reality technology to add a synthetic element 1006 (e.g., an augmented reality overlay) analogous to synthetic element 202 applied to image 100 for augmented reality image 200 described above.

In augmented reality image 1004-1, synthetic element 1006 is applied to image 1000 in a conventional manner (e.g., typical augmented reality overlay technology) that does not account for any object at the surgical site but, rather, overlays synthetic element 1006 so as to be in front of (i.e., to occlude) all of the objects and other scenery depicted in image 1000. This type of overlay application may be suitable for certain use cases, but it is noted that it may be undesirable, or at least non-ideal, in this type of augmented-reality-enhanced surgical procedure example. This is partially due to the nature of synthetic element 1006 and what the system aims to help the user do by including the augmented reality overlay.

Synthetic element 1006 may be any suitable image, depiction, or representation of information as may serve a particular implementation to assist surgical team members in their performance of the surgical procedure. For instance, in certain examples such as the example illustrated, synthetic element 1006 may be implemented by a model or other representation of subsurface anatomical structures that are of interest, but not visible, to the surgical team as the surgery proceeds. As one example, synthetic element 1006 may represent vasculature located just under the visible surface of the tissue and that has been imaged by another modality other than the endoscope capturing image 1000 (e.g., an ultrasound modality imaging the vasculature intraoperatively, a magnetic resonance imaging ("MRI") or computed tomography ("CT") scan that has imaged the vasculature preoperatively, etc.). Such vasculature may not be visible to the surgeon as he or she controls surgical instrument 1002, but may be of interest since the precise location of certain vasculature may influence the decisions the surgeon makes.

In other examples, synthetic element 1006 may represent text or graphical information that is desirable to be projected directly onto the surface tissue, a cleaned up rendering of the tissue itself (e.g., a representation of the tissue as it would appear if pooled blood, fat, smoke, or other obscurants were not present), or another such augmentation. In all of these examples, it is not necessarily desirable for synthetic element 1006 to block the depiction of surgical instrument 1002. For example, as shown in image 1004-1 where synthetic element 1006 occludes surgical instrument 1002, it may be disorienting, distracting, inconvenient, aesthetically unappealing, or otherwise undesirable for synthetic element 1006 to block the view of instrument 1002 in this way.

Accordingly, in image 1004-2, synthetic element 1006 is applied to image 1000 in accordance with methods and techniques described herein so as to apply synthetic element 1006 in a manner that does not overshadow or cover up surgical instrument 1002 (i.e., in a manner that appears to be behind surgical instrument 1002). For the reasons described above, this type of overlay application may be less disorienting, less distracting, more convenient, more aesthetically appealing, and so forth than the presentation of image 1004-1. Moreover, due to the highly dense depth information that may be generated for surgical instrument 1002 based on, for example, a CAD model of surgical instrument 1002, the application of synthetic element 1006 to image 1000 in image 1004-2 accurately aligns synthetic element 1006 and surgical instrument 1002 to provide an accurate and attractive augmented reality image such as the implementation illustrated in FIG. 8 (and contrasting with the misaligned and less accurate implementation illustrated in FIG. 3).

While surgical instrument 1002 is used as an exemplary recognized object in FIG. 10, it will be understood that any suitable object depicted in an image of a surgical site such as image 1000 may be made to appear in front of the synthetic element or augmented reality overlay in a particular example. If the recognized object is a computer-assisted surgical instrument being used to perform a surgical procedure (such as surgical instrument 1002), the model accessed by system 400 may be implemented as a 3D CAD model of the computer-assisted surgical instrument. In other examples, however, the recognized object may be held by a computer-assisted surgical instrument (rather than being the instrument itself), or may be located elsewhere within the image. As one example, the recognized object may be a needle and/or thread that is held by surgical instrument 1002 (not explicitly shown) for use in stitching a suture for the surgical procedure. As another example, the recognized object may be an ultrasound module held or otherwise connected to surgical instrument 1002. In such examples where the recognized object is held by a computer-assisted surgical instrument being used to perform a surgical procedure, the model accessed by system 400 may have been generated by way of a 3D scan of the recognized object (e.g., a 3D scan performed preoperatively or intraoperatively if a CAD model was unavailable).

Figure 11:
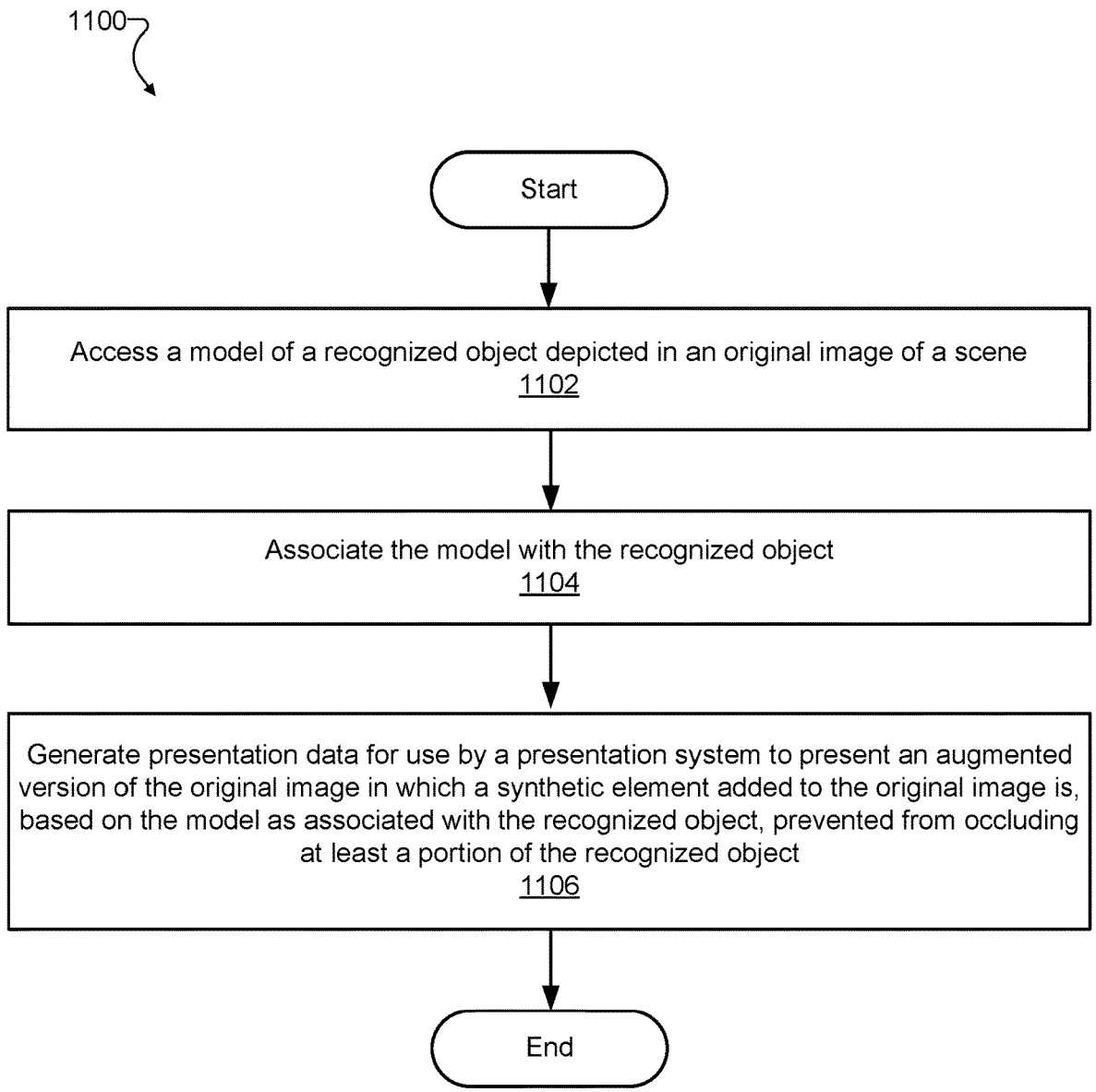
FIG. 11 illustrates an exemplary method for masking a recognized object during an application of a synthetic element to an original image according to principles described herein.

FIG. 11 illustrates an exemplary method 1100 for masking a recognized object during an application of a synthetic element to an original image. While FIG. 11 illustrates exemplary operations according to one embodiment, other embodiments may omit, add to, reorder, combine, and/or modify any of the operations shown in FIG. 11. One or more of the operations shown in in FIG. 11 may be performed by an object masking system such as system 400, any components included therein, and/or any implementation thereof.

In operation 1102, an object masking system may access a model of a recognized object depicted in an original image of a scene. Operation 1102 may be performed in any of the ways described herein.

In operation 1104, the object masking system may associate the model accessed in operation 1102 with the recognized object depicted in the original image. Operation 1104 may be performed in any of the ways described herein.

In operation 1106, the object masking system may generate presentation data for use by a presentation system to present an augmented version of the original image. In some examples, a synthetic element is to be added to the original image for the augmented version. Thus, operation 1106 may be performed in manner in which the synthetic element is prevented, based on the model as associated with the recognized object in operation 1104, from occluding at least a portion of the recognized object. In this way, the synthetic element may be depicted in the augmented version of the original image to appear as if the synthetic element is located behind the recognized object. Operation 1106 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to. RAM (e.g., dynamic RAM).

Figure 12:
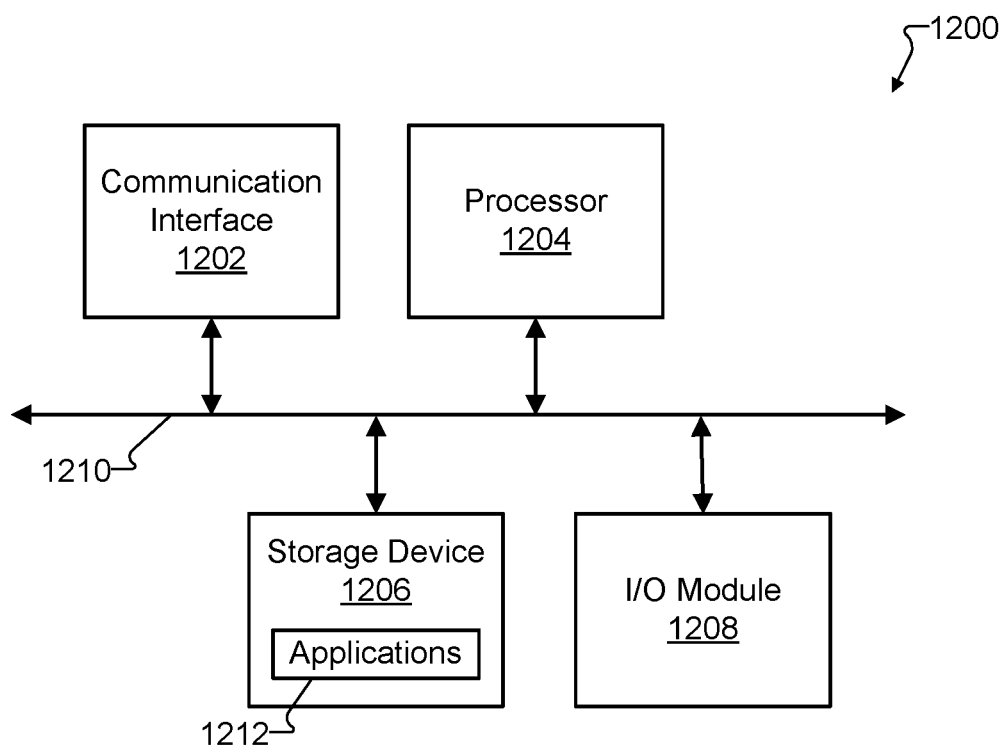
FIG. 12 illustrates an exemplary computing device according to principles described herein.

FIG. 12 illustrates an exemplary computing device 1200 that may be specifically configured to perform one or more of the processes described herein. Any of the systems, units, computing devices, and/or other components described herein may be implemented by computing device 1200.

As shown in FIG. 12, computing device 1200 may include a communication interface 1202, a processor 1204, a storage device 1206, and an input/output ("I/O") module 1208 communicatively connected one to another via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data and/or interpreting, executing, and/or directing execution of one or more of the instructions, processes, and/or operations described herein. Processor 1204 may perform operations by executing computer-executable instructions 1212 (e.g., an application, software, code, and/or other executable data instance) stored in storage device 1206.

Storage device 1206 may include one or more data storage media, devices, or configurations and may employ any type, form, and combination of data storage media and/or device. For example, storage device 1206 may include, but is not limited to, any combination of the non-volatile media and/or volatile media described herein. Electronic data, including data described herein, may be temporarily and/or permanently stored in storage device 1206. For example, data representative of computer-executable instructions 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct an implementation of processor 1204 to perform one or more operations or functions associated with processing facility 404 of system 400. Likewise, storage facility 402 of system 400 may be implemented by or within an implementation of storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a memory storing instructions; and
a processor communicatively coupled to the memory and configured to execute the instructions to:
   access a model of a recognized object depicted in an original image of a scene;
   associate the model with the recognized object; and
   generate presentation data for use by a presentation system to present an augmented version of the original image in which a synthetic element added to the original image is, based on the model as associated with the recognized object, prevented from occluding at least a portion of the recognized object,
wherein the associating of the model with the recognized object includes:
   generating a depth map of imagery depicted by the original image, the depth map including first depth data for a depiction of the recognized object within the imagery and second depth data for a remainder of the imagery, the first depth data based on the model of the recognized object and denser than the second depth data; and
   segmenting the original image to distinguish pixels of the original image that depict the recognized object from pixels of the original image that do not depict the recognized object by
      identifying the pixels of the original image that depict the recognized object based on the first depth data; and
      identifying the pixels of the original image that do not depict the recognized object based on the second depth data.

2. The system of claim 1, wherein:
the original image is a video image consisting of a sequence of image frames each depicting the recognized object as the recognized object moves with respect to other imagery depicted by the original image; and
the processor is further configured to execute the instructions to identify the recognized object within imagery depicted by the video image by
initially recognizing the recognized object in a first image frame of the sequence of image frames, and
tracking, based on the initial recognition, the recognized object from image frame to image frame as the recognized object moves with respect to the other imagery in later image frames of the sequence of image frames.

3. The system of claim 1, wherein the processor is further configured to execute the instructions to:
access kinematic data representative of a pose of the recognized object; and
identify the recognized object within imagery depicted by the original image based on the kinematic data.

4. The system of claim 1, wherein:
the scene depicted by the original image includes a surgical site at which a surgical procedure is being performed by way of a computer-assisted surgical instrument being used to perform the surgical procedure;
the recognized object is the computer-assisted surgical instrument; and
the synthetic element added to the original image for the augmented version of the original image is an anatomical model generated prior to the surgical procedure using a preoperative imaging modality.

5. The system of claim 1, wherein the recognized object is a computer-assisted surgical instrument being used to perform a surgical procedure, and the model is a three-dimensional ("3D") computer-aided design ("CAD") model of the computer-assisted surgical instrument.

6. The system of claim 1, wherein the recognized object is held by a computer-assisted surgical instrument being used to perform a surgical procedure, and the model is generated by way of a 3D scan of the recognized object.

7. The system of claim 1, wherein the processor is further configured to execute the instructions to provide the generated presentation data to the presentation system for use in presenting the augmented version of the original image.

8. A method comprising:
accessing, by an object masking system, a model of a recognized object depicted in an original image of a surgical scene;
associating, by the object masking system, the model with the recognized object; and
generating, by the object masking system, presentation data for use by a presentation system to present an augmented version of the original image in which a synthetic element added to the original image is, based on the model as associated with the recognized object, prevented from occluding at least a portion of the recognized object,
wherein the associating of the model with the recognized object includes:
generating a depth map of imagery depicted by the original image, the depth map including first depth data for a depiction of the recognized object within the imagery and second depth data for a remainder of the imagery, the first depth data based on the model of the recognized object and denser than the second depth data; and
segmenting the original image to distinguish pixels of the original image that depict the recognized object from pixels of the original image that do not depict the recognized object by
identifying the pixels of the original image that depict the recognized object based on the first depth data; and
identifying the pixels of the original image that do not depict the recognized object based on the second depth data.

9. The method of claim 8, wherein:
the original image is a video image consisting of a sequence of image frames each depicting the recognized object as the recognized object moves with respect to other imagery depicted by the original image; and
the method further comprises identifying the recognized object within imagery depicted by the video image by
initially recognizing the recognized object in a first image frame of the sequence of image frames, and
tracking, based on the initial recognition, the recognized object from image frame to image frame as the recognized object moves with respect to the other imagery in later image frames of the sequence of image frames.

10. The method of claim 8, further comprising:
accessing, by the object masking system, kinematic data representative of a pose of the recognized object; and
identifying, by the object masking system, the recognized object within imagery depicted by the original image based on the kinematic data.

11. The method of claim 8, wherein:
the scene depicted by the original image includes a surgical site at which a surgical procedure is being performed by way of a computer-assisted surgical instrument being used to perform the surgical procedure;
the recognized object is the computer-assisted surgical instrument; and
the synthetic element added to the original image for the augmented version of the original image is an anatomical model generated prior to the surgical procedure using a preoperative imaging modality.

12. The method of claim 8, wherein the recognized object is a computer-assisted surgical instrument being used to perform a surgical procedure, and the model is a three-dimensional ("3D") computer-aided design ("CAD") model of the computer-assisted surgical instrument.

13. The method of claim 8, wherein the recognized object is held by a computer-assisted surgical instrument being used to perform a surgical procedure, and the model is generated by way of a 3D scan of the recognized object.

14. The method of claim 8, further comprising:
presenting, based on the presentation data, an augmented image that includes the original image augmented with only a portion of the synthetic element.

15. A non-transitory computer-readable medium storing instructions that, when executed, direct a processor of a computing device to:
access a model of a recognized object depicted in an original image of a surgical scene
associate the model with the recognized object; and
generate presentation data for use by a presentation system to present an augmented version of the original image in which a synthetic element added to the original image is, based on the model as associated with the recognized object, prevented from occluding at least a portion of the recognized object, wherein the associating of the model with the recognized object includes:

generating a depth map of imagery depicted by the original image, the depth map including first depth data for a depiction of the recognized object within the imagery and second depth data for a remainder of the imagery, the first depth data based on the model of the recognized object and denser than the second depth data; and segmenting the original image to distinguish pixels of the original image that depict the recognized object from pixels of the original image that do not depict the recognized object by identifying the pixels of the original image that depict the recognized object based on the first depth data; and identifying the pixels of the original image that do not depict the recognized object based on the second depth data.

16. The non-transitory computer-readable medium of claim 15, wherein:

the original image is a video image consisting of a sequence of image frames each depicting the recognized object as the recognized object moves with respect to other imagery depicted by the original image; and the instructions further direct the processor to identify the recognized object within imagery depicted by the video image by initially recognizing the recognized object in a first image frame of the sequence of image frames, and tracking, based on the initial recognition, the recognized object from image frame to image frame as the recognized object moves with respect to the other imagery in later image frames of the sequence of image frames.

17. The non-transitory computer-readable medium of claim 15, wherein the instructions further direct the processor to:

access kinematic data representative of a pose of the recognized object; and identify the recognized object within imagery depicted by the original image based on the kinematic data.

* * * * *